(12) United States Patent
Ota

(10) Patent No.: US 7,905,765 B2
(45) Date of Patent: Mar. 15, 2011

(54) PARALLEL MECHANISM, CALIBRATION METHOD FOR USE IN THE SAME, AND MACHINE TOOL INCLUDING THE SAME

(75) Inventor: Hiromichi Ota, Kariya (JP)

(73) Assignee: JTEKT Corporation, Osaka-shi (JP)

( * ) Notice: Subject to any disclaimer, the term of this patent is extended or adjusted under 35 U.S.C. 154(b) by 1148 days.

(21) Appl. No.: 11/562,650

(22) Filed: Nov. 22, 2006

(65) Prior Publication Data

US 2007/0295139 A1 Dec. 27, 2007

(30) Foreign Application Priority Data

Nov. 24, 2005 (JP) .................................. 2005-339462
Nov. 25, 2005 (JP) .................................. 2005-340666

(51) Int. Cl.
*B24B 49/00* (2006.01)
(52) U.S. Cl. ..................... 451/11; 451/8; 451/160
(58) Field of Classification Search .................. 451/5, 8, 451/11, 160
See application file for complete search history.

(56) References Cited

U.S. PATENT DOCUMENTS

| | | | | |
|---|---|---|---|---|
| 4,100,700 A | * | 7/1978 | Peirce et al. | 451/5 |
| 4,209,948 A | * | 7/1980 | Obear | 451/213 |
| 5,286,006 A | * | 2/1994 | Ogura | 266/77 |
| 5,475,196 A | * | 12/1995 | Lisec | 219/121.39 |
| 6,201,207 B1 | * | 3/2001 | Maruyama et al. | 219/121.39 |
| 6,311,098 B1 | * | 10/2001 | Higasayama et al. | 700/159 |
| 6,923,713 B2 | * | 8/2005 | Yoshimi et al. | 451/236 |
| 2004/0185758 A1 | * | 9/2004 | Olsen | 451/99 |
| 2010/0130107 A1 | * | 5/2010 | Yilmaz et al. | 451/56 |

FOREIGN PATENT DOCUMENTS

| | | |
|---|---|---|
| JP | 11-114777 | 4/1999 |
| JP | 2002-263973 | 9/2002 |
| JP | 2003-291042 | 10/2003 |
| WO | WO 99/32256 | 7/1999 |
| WO | WO 02/085580 | 10/2002 |

OTHER PUBLICATIONS

U.S. Appl. No. 12/020,142, filed Jan. 25, 2008, Sugiyama et al.

* cited by examiner

*Primary Examiner* — Maurina Rachuba
(74) *Attorney, Agent, or Firm* — Oblon, Spivak, McClelland, Maier & Neustadt, L.L.P.

(57) ABSTRACT

A parallel mechanism adapted to control at least one of pivotal movement and linear movement of a link head having three degrees of freedom. The parallel mechanism has four actuators for driving the link head, and link groups which have four links connected to the four actuators, respectively, and each of which is connected to the link head. A rotation joint interposed between each of the link groups and the link head is made a linear joint which is connected to the link head so as to be relatively movable in one axis direction with respect to the link head.

20 Claims, 18 Drawing Sheets

PARALLEL MECHANISM, CALIBRATION METHOD FOR USE IN THE SAME, AND MACHINE TOOL INCLUDING THE SAME

The present application is based on Japanese patent application Nos. 2005-339462 and 2005-340666, the entire contents of which are incorporated herein by reference.

BACKGROUND OF THE INVENTION

1. Field of the Invention

The invention relates to a parallel mechanism which, for example, is used as a driving force-transmitting mechanism when a tool (processing tool) for processing a work piece (work) is displaced, a calibration method for use in the same, and a machine tool including the same.

2. Description of the Related Art

A grinding machine, a turning machine, a milling machine and the like are well known as machine tools, and the various kinds of machine tools are selectively used in accordance with required processing contents.

In such a machine tool, a spindle head for supporting a tool such as a grinding wheel or a cutting tool, a table for supporting a work, and the like are moved to desired positions, or are pivoted at desired angles, respectively, to relatively displace the work and the tool, thereby performing processing such as grinding or cutting.

In recent years, a machine tool including a parallel mechanism which has links and in which constituent components or parts ranging from a base to a link head are coupled in parallel to one another has come to attract attention as this sort of machine tool because it is effective as a mechanism for realizing high rigidity, high precision and high speed processing. For example, a machine tool as shown in FIG. 16 (in which its part is illustrated) has been known. This machine tool, for example, is disclosed in JP-A-2003-291042 (FIG. 1).

A parallel mechanism of this mechanical tool will be described hereinafter with reference to FIG. 16. In FIG. 16, a parallel mechanism 150 includes a link head 152 which is movably and pivotably disposed in a bed (not shown) as a base in the machine tool through a slide base 151, and four operation rods 153 to 156 which are interposed between the link head 152 and a bed (rails) so as to be drivable by actuators (not shown).

The link head 152 is held by one side end portions (side end portions opposite to respective rails) of the operation rods 153 to 156, and thus can be moved and pivoted, together with the slide base 151, on the bed by driving the operation rods 153 to 156. A processing tool 170 such as a grinding wheel is rotatably held by the link head 152.

The operation rods 153 and 154 have link insertion portions 153A and 154A, respectively, one side end portions thereof are pivotably coupled to each other on the link head 152 through a common pivot support 157, and the other side end portions thereof are pivotably coupled to sliders 159 and 160 on a rail 158 through pivot supports 161 and 162, respectively.

The operation rods 155 and 156 are inserted through the link insertion portions 153A and 154A so as to cross the operation rods 153 and 154, respectively. Also, one side ends of the operation rods 155 and 156 are pivotably coupled to each other on the link head 152 through a common pivot support 163, and the other side end portions thereof are pivotably coupled to sliders 165 and 166 on a rail 164 disposed in parallel to the rail 158 through pivot supports 167 and 168, respectively.

The pivot support 157 is disposed in a position which lies on the link head 152 and is close to the grinding wheel side, and the pivot support 163 is disposed in a position, on the link head 152, which lies on the inverse grinding wheel side and which is at distance away from the pivot support 157 by a predetermined size.

In the parallel mechanism 150 thus constructed, when the sliders 159 and 160, and the sliders 165 and 166 are slid on the rails 158 and 164, respectively, by driving the individual actuators, respectively, the operation rods 153 to 156 are driven, so that the link head 152 can be moved or pivoted together with the slide base 151 on the bed in accordance with this driving operation.

In addition, in recent years, a machine tool including a parallel mechanism which has links and in which constituent components or parts from a base to a link head are coupled in parallel to one another has come to attract attention as this sort of machine tool because it is effective as a mechanism for realizing high rigidity, high precision and high speed processing. For example, a machine tool as shown in FIG. 17 (in which only its part is illustrated) has been known as this sort of machine tool. This machine tool, for example, is disclosed in JP-A-11-114777 (FIG. 1).

This machine tool will be described hereinafter with reference to FIG. 17. In FIG. 17, a machine tool 11 includes a parallel mechanism 12 which is suspended from a ceiling 50 through a supporting column 51, and a table 13 which is located below the parallel mechanism 12.

A processing tool (not shown) and a measuring instrument 40 are selectively mounted to a link head of the parallel mechanism 12. On the other hand, a work (not shown) and a measurement jig 60 are similarly and selectively installed in a table 13.

In addition, a machine tool as shown in FIG. 18 has also been known as conventional one. This machine tool, for example, is disclosed in JP-A-2002-263973. Referring to FIG. 18, in a machine tool 20 (only its part is illustrated), an angle sensor 40V with which a rotation angle of a rotation joint 16b can be measured is mounted to the rotation joint 16b constituting a part of a parallel mechanism.

Now, in this sort of machine tool, command values corresponding to information or the like, on a tip position of a tool, which is given in accordance with a rectangular coordinate system are converted (inversely converted) into output values of actuators, and thus the driving of the actuators is controlled. In this case, mechanism parameters such as an inclined angle and a length of each of constituent components or parts are used in the conversion from the command values into the output values. These mechanism parameters do not necessarily agree with design values due to occurrence of a manufacturing error and an assembly error in each of the constituent components or parts. In addition, these mechanism parameters are changed due to displacement resulting from thermal expansion, contraction or the like of the parallel mechanism caused by a change in temperature of an operating situation or an ambient atmosphere of the machine tool. For this reason, there is carried out so-called calibration that the values of the actual mechanism parameters are obtained from the measured values about the positions and postures of the tools through arithmetic operation in the phase of or after shipment of the machine tool (in the phase of adjustment in the field before the operation of the machine tool, in the phase of maintenance for the operation of the machine tool, etc.), and the resulting values are used, instead of the design values, for the conversion from the command values into the output values of the actuators.

However, the machine tool disclosed in JP-A-2003-291042 involves the following problems (1) to (3).

(1) Since the pivot supports 157 and 163 are disposed so as not to be movable on the link head 152, the position of the pivot support 157, and the position of the pivot support 163 are determined in accordance with the sliding positions of the sliders 159 and 160, and the sliding positions of the sliders 165 and 166, respectively. As a result, when the processing precision of the constituent components or parts or the precision of the assembly among the constituent components or parts is poor, or when the operation rods 153 to 156 are caused to expand and contract due to the thermal change in the phase of use or the like, size errors are caused between the design sizes and measured sizes of both the pivot supports 157 and 163, so that the constituent components or parts are damaged or the overload is applied to each of the actuators.

(2) The mechanical tool adopts the construction that the operation rods 155 and 156 are inserted through the link insertion portions 153A and 154A to cross the operation rods 153 and 154, respectively. Thus, since it is necessary to avoid the interference between the operation rods, the pivotal angles of the operation rods 153 and 154, and the operation rods 155 and 156 cannot be set as the sufficient large angles, respectively, which results in that the desired movement and pivotal movement operation cannot be obtained as the movement and pivotal movement operation of the link head 152.

(3) The operation rods 153 and 154, and the operation rods 155 and 156 are disposed in the positions, on the same virtual plane, which are symmetrical with respect to the virtual axis making a right angle with the rotation axis of the processing tool 170. Hence, a wide space must be ensured as the installation space for the operation rods 153 to 156, and the rails 158 and 164, which results in the scaling up of the overall parallel mechanism 150.

In addition, according to the machine tool disclosed in JP-A-11-114777, the measuring instrument 40 and the measurement jig 60 are mounted to the machine tool 11 after the tools are detached from the machine tool 11 in the phase of carrying out the calibration, which results in that it takes much work time to carry out the calibration.

On the other hand, according to the machine tool disclosed in JP-A-2002-263973, the mechanism parameters are corrected by detecting the small angle error of the rotation joint 16b by using the angle sensor 40V, which results in that the precision of detection of the angle error is poor, and thus the satisfactory identification precision cannot be obtained for the mechanism parameters.

SUMMARY OF THE INVENTION

In the light of the foregoing, it is therefore an object of the invention to provide a parallel mechanism which is capable of preventing generation of damage or the like of constituent components or parts, of obtaining a desired movement and pivotal movement operation as a movement and pivotal movement operation of a link head, and of miniaturizing the overall parallel mechanism, a calibration method for use in the same, and a machine tool including the same.

In addition, it is another object of the invention to provide a controller for a machine tool which is capable of shortening work time that it takes to carry out calibration, and of obtaining satisfactory identification precision for mechanism parameters.

(1) In order to attain the above-mentioned objects, according to one embodiment of the invention, there is provided a parallel mechanism adapted to control at least one of pivotal movement and linear movement of a link head having N (N: natural number) degrees of freedom, the parallel mechanism including:

(N+1) driving mechanisms for driving the link head; and a link mechanism including (N+1) links connected to the (N+1) driving mechanisms, respectively, the link mechanism being connected to the link head, wherein one of connection portions interposed between the link mechanism and the link head is made a slave connection portion which is connected to the link head so as to be relatively movable in one axial direction with respect to the link head.

(2) In order to attain the above-mentioned objects, according to another embodiment of the invention, there is provided a parallel mechanism including:

a bed;

a first link mechanism including a pair of links having one ends which are connected to each other so as to be pivotable about a first axis through a first pivotal movement portion and the other ends which are supported by the bed so as to pivotable about an axis parallel to the first axis and so as to be movable along a second axis intersecting perpendicularly the first axis with respect to the bed;

a second link mechanism including a pair of links having one ends which are connected to each other so as to be pivotable about an axis parallel to the first axis through a second pivotal movement portion and the other ends which are supported by the bed so as to be pivotable about an axis parallel to the first axis and so as to be movable along the second axis with respect to the bed;

a driving mechanism for moving the other ends of each of the pairs of links along the second axis with respect to the bed; and a link head to which the first pivotal movement portion is connected relatively and movably in one axis direction intersecting perpendicularly the first axis, and to which the second pivotal movement portion is connected so as to be relatively nonmovable in a position where the second pivotal movement portion is offset in a direction intersecting perpendicularly the first axis with respect to a connection portion of the first pivotal movement portion, wherein the link head is adapted to be moved within a plane intersecting perpendicularly the first axis and to be pivoted about the first axis by controlling the driving mechanism.

(3) In order to attain the above-mentioned objects, according to another embodiment of the invention, there is provided a machine tool including the parallel mechanism according to the above embodiment (2), in which one of a tool or a work is mounted to the link head, and the other of the tool or the work is mounted to the head.

(4) In order to attain the above-mentioned objects, according to another embodiment of the invention, there is provided a parallel mechanism adapted to control an operation of at least one of pivotal movement and linear movement of a link head having N (N: natural number) degrees of freedom, the parallel mechanism including:

(N+1) driving mechanisms for driving the link head;

a link mechanism for connecting the (N+1) driving mechanisms and the link head to each other;

a slave connection portion for connecting one of connection portions between the link mechanism and the link head so that the one connection portion is relatively movable in one axial direction with respect to the link head;

a detector for detecting an amount of relative movement between the slave connection portion and the link head; and a control portion for converting command values corresponding to at least one of a pivotal movement position and a movement position, of the link head, given in accordance with a rectangular coordinate system into command values for the (N+1) driving mechanisms in accordance with mechanism parameters used to prescribe a construction of the overall parallel mechanism in order to control the driving mechanism, wherein the control portion corrects the mechanism parameters in accordance with command values for the (N+1) driving mechanisms when the link head is operated by a predetermined amount of pivotal movement and a predetermined amount of movement, and output values of the detector at that time.

(5) In order to attain the above-mentioned objects according to another embodiment of the invention, there is provided a parallel mechanism adapted to control an operation, of a link head, corresponding to three degrees of freedom by pivoting the link head about a first axis, and by moving the link head within a plane intersecting perpendicularly the first axis, the parallel mechanism including:

four driving mechanisms for driving the link head;

a first link mechanism including a pair of links having one ends which are connected to the link head so as to be pivotable about an axis parallel to the first axis through a first pivotal movement portion connected to a slave connection portion adapted to be moved relatively with respect to the link head, and the other ends which are connected to the corresponding ones of the four driving mechanisms, respectively;

a second link mechanism including a pair of links having one ends which are connected to the link head so as to be pivotable about an axis parallel to the first axis through a second pivotal movement portion connected relatively non-movably to a position which is offset in a direction intersecting perpendicularly the first axis with respect to a connection position of the first pivotal movement portion of the link head, and the other ends which are connected to the corresponding ones of the four driving mechanisms, respectively;

a detector for detecting an amount of relative movement between the slave connection portion and the link head; and a control portion for converting command values corresponding to a pivotal movement position and a movement position, of the link head, given in accordance with a rectangular coordinate system into command values for the four driving mechanisms in accordance with mechanism parameters used to prescribe a construction of the overall parallel mechanism in order to control the four driving mechanisms, wherein the control portion corrects the mechanism parameters in accordance with command values for the four driving mechanism when the link head is operated by a predetermined amount of pivotal movement and a predetermined amount of movement, and output values of the detector at that time.

(6) In order to attain the above-mentioned objects, according to another embodiment of the invention, there is provided a calibration method for use in the parallel mechanism according to the above embodiment (4) or (5), including the steps of:

performing an operation for at least one of pivotal movement and linear movement, which are made at least k times (k; natural number) for the k mechanism parameters, to different positions and postures of the link head to acquire k output values from the detector at that time; and identifying correction values for the k mechanism parameters in accordance with command values for the four driving mechanisms when the pivotal movement and linear movement of the link head are made at least k times, and the k output values from the detector.

Advantages of the Invention

According to the invention, the damage or the like of the constituent components or parts can be prevented from being generated, the desired movement and pivotal movement operation can be obtained as the movement and pivotal movement operation of the link head, and the overall parallel mechanism can be miniaturized.

In addition, according to the invention, the work time that it takes to carry out the calibration can be shortened, and the satisfactory identification precision for the mechanism parameters can be obtained.

DETAILED DESCRIPTION OF PREFERRED EMBODIMENTS

First Embodiment

Figure 1:
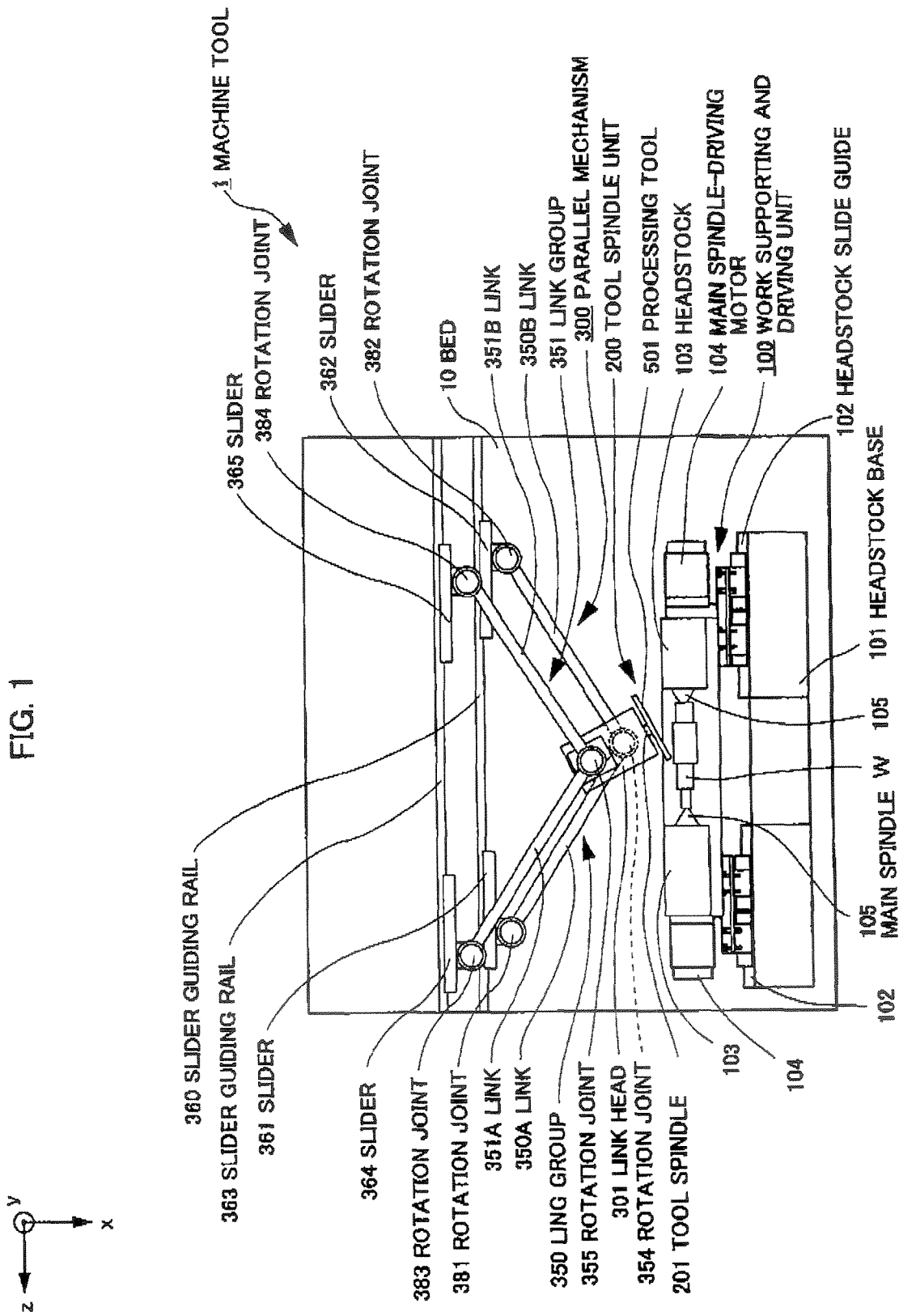
FIG. 1 is a plan view explaining an overall machine tool according to a first embodiment of the invention.
Figure 2:
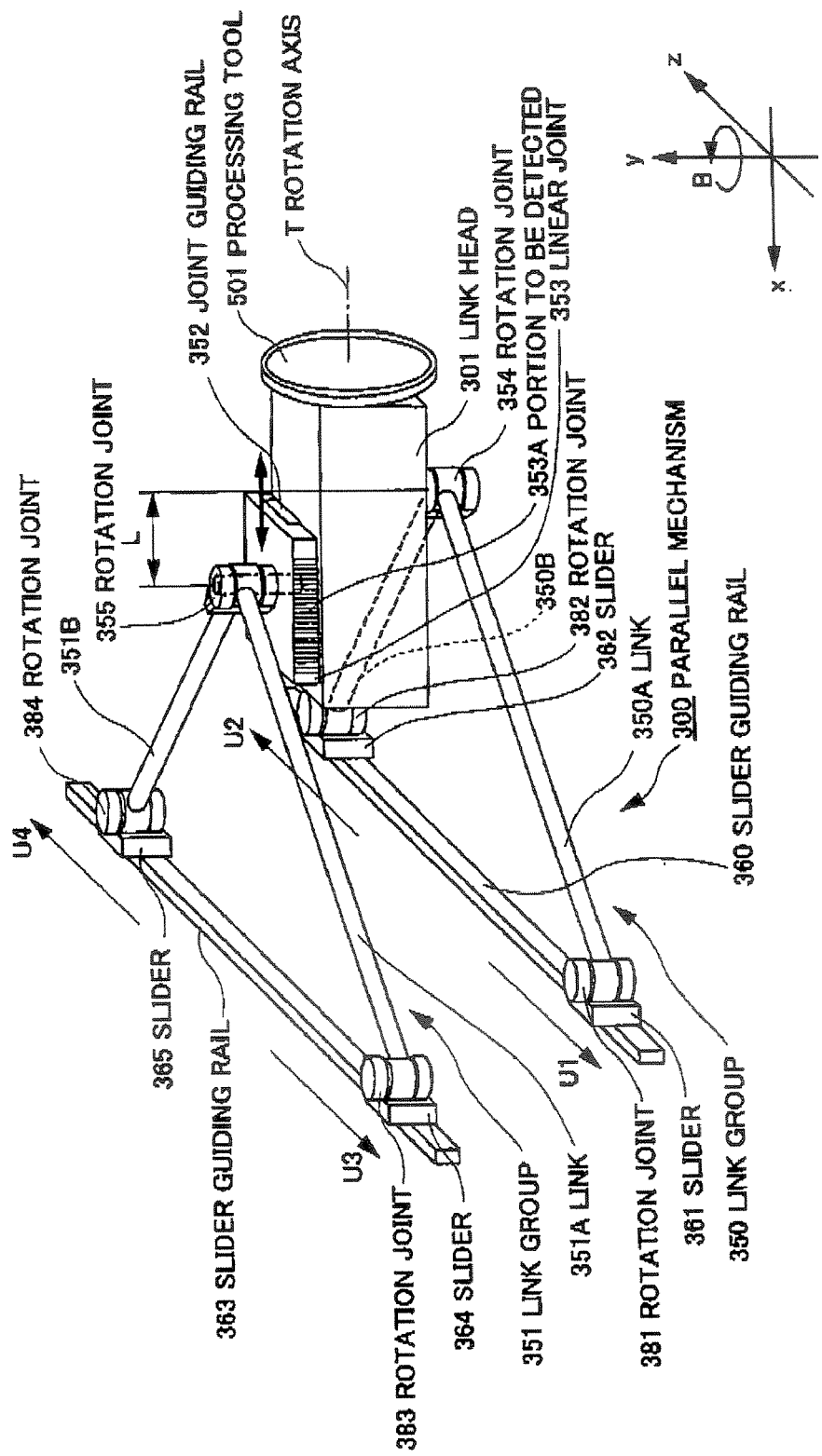
FIG. 2 is a perspective view explaining main portions of the machine tool according to the first embodiment of the invention.
Figure 3:
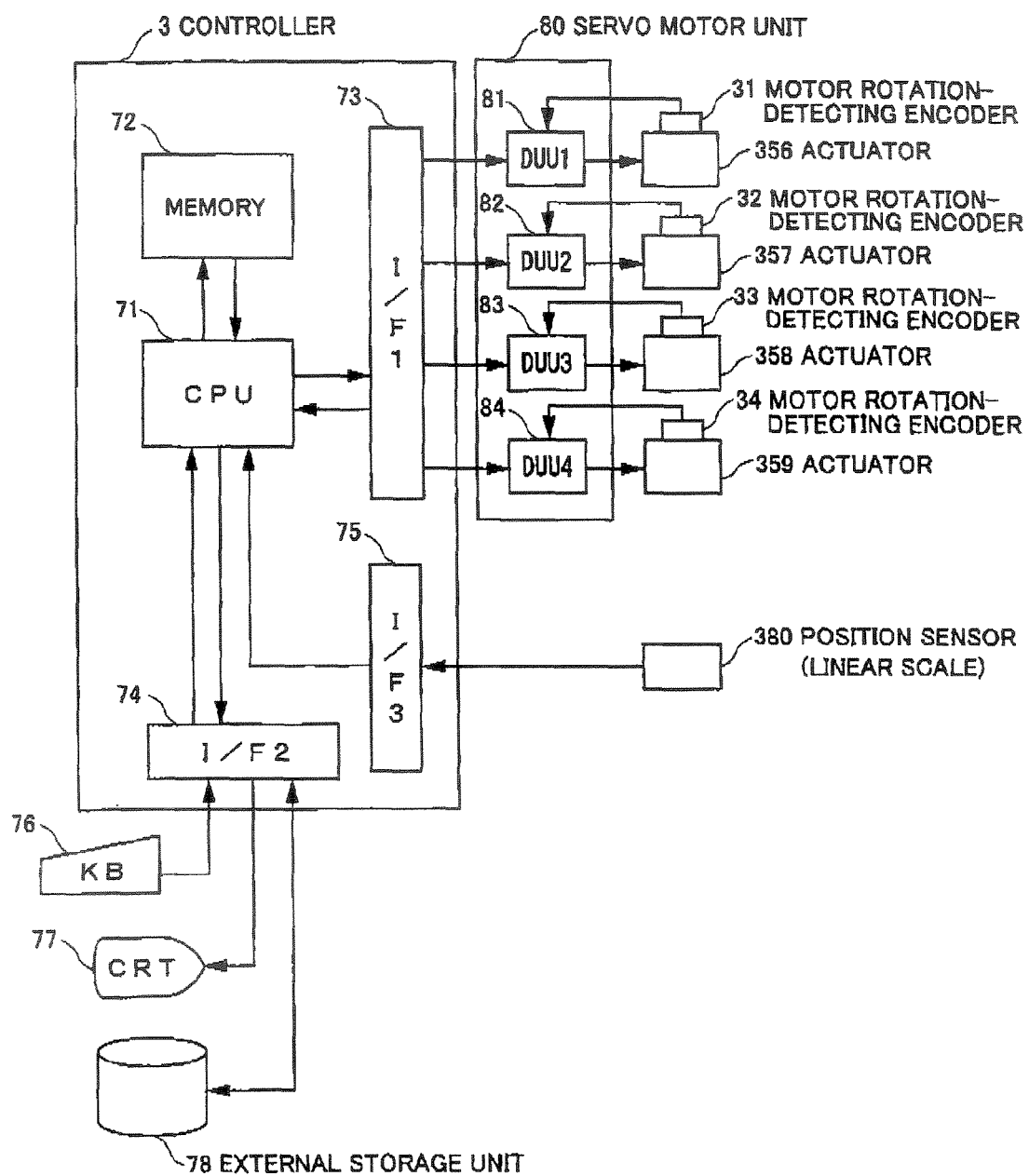
FIG. 3 is a block diagram explaining a controller of the machine tool according to the first embodiment of the invention.

FIG. 1 is a plan view explaining an overall machine tool according to a first embodiment of the invention. FIG. 2 is a perspective view explaining main portions of the machine tool according to the first embodiment of the invention. Also, FIG. 3 is a block diagram explaining a controller of the machine tool according to the first embodiment of the invention. Note that, in the following description, three directions intersecting perpendicularly one another are defined as a z-axis (second axis) direction (a main spindle direction in FIG. 1), an x-axis (third axis) direction (a direction parallel to a paper and intersecting perpendicularly the z-axis in FIG. 1), and a y-axis (first axis) direction (a direction vertical to the paper and intersecting perpendicularly the z-axis).

Construction of Overall Machine Tool

Referring to FIGS. 1 and 3, a machine tool 1, for example, is a cylindrical grinding machine, and is roughly constituted by a machine tool main body, a controller 3, and attachments (not shown).

Construction of Machine Tool Main Body

As shown in FIG. 1, the machine tool main body includes a work supporting and driving unit 100 for supporting a work W in a rotation-drivable manner, a tool spindle unit 200 in which a processing tool 501 such as a grinding wheel is detachably attached, and a parallel mechanism 300 for holding a link head 301 on a tool installation side.

Construction of Work Supporting and Driving Unit

The work supporting and driving unit 100 has a headstock base 101, and left- and right-hand side two main headstocks 103, and is placed in a front end portion (on a lower side in FIG. 1) on a bed 10. Left- and right-hand side two headstock slide guides 102 which are arranged in parallel at a predetermined space in a horizontal (z-axis) direction and which extend in the z-axis direction are disposed in a back face portion (on an upper side in FIG. 1) of the headstock base 101. The left- and right-hand side two headstocks 103 are disposed movably along the z-axis direction on the corresponding headstock slide guides 102, respectively. Also, the left- and right-hand side two headstocks 103 are positioned in predetermined positions on the corresponding headstock slide guides 102, respectively, and hold the work W between their central portions Main spindle-driving motors 104 for rotation-driving the main spindles 105 at a predetermined rotational frequency, respectively, are installed in the left- and right-hand side two headstocks 103, respectively.

Construction of Tool Spindle Unit

The tool spindle unit 200 has a tool spindle 201 which can hold a portion to be held of the processing tool 501, and a tool spindle-driving motor (not shown) for rotation-driving the tool spindle 201, and is installed in the link head 301. Also, the tool spindle unit 200 transmits a rotation driving force of the tool spindle-driving motor to the tool spindle 201, and rotation-drives the processing tool 501 on the tool spindle 201 at a predetermined rotational frequency.

Construction of Parallel Mechanism

As shown in FIG. 2, the parallel mechanism 300 includes link mechanisms having multiple degrees of freedom (three degrees of freedom, that is, straight line two axes and a rotation one axis) and having a pair of link groups (link mechanisms) 350 and 351. The parallel mechanism 300 is disposed in the rear of the work supporting and driving unit 100 and is held in a cantilever style by a riser member (not shown) of the bed 10 through slider guiding rails (guide rails) 360 and 363 which extend in the z-axis direction. Also, as described above, the parallel mechanism 300 holds the link head 301 on the tool mounting side. The slider guiding rails 360 and 363 extend in the z-axis direction, and are disposed in respective positions where they are arranged in parallel at a mutually predetermined space in the y-axis direction.

The link head 301 is held by link head side end portions of the link groups 350 and 351. Also, the link head 301 can be pivoted about the y-axis on the same virtual plane (movement and pivotal movement virtual plane) intersecting perpendicularly the y-axis with respect to the bed 10 and can be moved in the two directions, that is, in the x-axis direction and the z-axis direction with respect to the bed 10.

A joint guiding rail 352 which is disposed in parallel to a rotation axis T of the processing tool 501, and a linear joint (displacement mechanism) 353 with a portion to be detected which can be moved in a direction indicated by an arrow (that is, one axis direction intersecting perpendicularly the y-axis) on the joint guiding rail 352 are disposed on an upper surface portion of the link head 301. A first pivotal movement portion (connection portion) which has one degree of freedom and which is disposed in parallel to a rotation joint 354 along the rotation axis T within the movement and pivotal movement virtual plane of the link head 301, that is, a rotation joint 355 which has one degree of freedom and which is rotated around an axis parallel to the y-axis is disposed on an upper surface portion of the linear joint 353. As a result, the rotation joint 355 is moved, together with the linear joint 353, on the joint guiding rail 352. In addition, a position sensor 380 (See FIG. 3), such as a linear scale, for detecting a portion (slits) 353A to be detected of the linear joint 353 to detect an error of a distance L between both the rotation joints 354 and 355 is disposed on an upper surface portion of the link head 301.

A second pivotal movement portion (connection portion) unable to be moved in a position which is offset in a movement direction of the linear joint 353 with respect to the position where the rotation joint 355 is disposed, that is, a rotation joint 354 which has one degree of freedom and which is rotated around the axis parallel to the y-axis is disposed on a lower surface portion of the link head 301.

A pair of link groups 350 and 351 is disposed between the bed (or riser member) 10 and the link head 301, and is held in a position where a movement and pivotal movement virtual plane of the link head 301 is set as a horizontal plane. Also, the link head 301 is moved in the x-axis and z-axis directions on the same movement and pivotal movement plane and also is pivoted about the y-axis by driving actuators 356 and 359 (See FIG. 3), thereby changing its position and posture. A driving mechanism including feed screws (not shown) for moving the sliders, respectively, which will be described later, and servo motors for driving these feed screws, respectively, is used as each of the actuators 356 to 359. Motor rotation-detecting encoders 31 to 34 (See FIG. 3) are mounted to the actuators 356 to 359, respectively. Note that, a driving mechanism such as a linear motor may be used as each of the actuators 356 to 359.

One link group (second link mechanism) 350 has two links 350A and 350B each of which can be pivoted on a virtual plane parallel to the movement and pivotal movement virtual plane of the link head 301, and is disposed below the link head 301. Link lengths of the links 350A and 350B are set as the same size.

One link end portion of the link 350A is movably and pivotably linked to the slider guiding rail 360 on the bed 10 through the slider 361 and the rotation joint 381, and the other link end portion thereof is pivotably linked to the rotation joint 354. Also, the link 350A can be moved on the slider guiding rail 360 by the actuator 356. Here, the rotation joint 381 functions as a joint which has one degree of freedom and which is rotated around the axis parallel to the y-axis.

One link end portion of the link 350B is movably and pivotably linked to the slider guiding rail 360 on the bed 10 through the slider 362 and the rotation joint 382, and the other link end portion thereof is pivotably linked to the rotation joint 354. Also, the link 350B can be moved on the rail 360 by the actuator 357 so as to come close to or so as to be separated from the link 350A (the rotation joint 381). Here, the rotation joint 382 functions as a joint which has one degree of freedom and which is rotated around the axis parallel to the y-axis.

The other link group (first link mechanism) 351 has two links 351A and 351B which can be pivoted on a virtual plane parallel to a movement and pivotal movement virtual plane (a virtual plane parallel to a virtual plane having the link group 351 disposed thereon) of the head link 301. Also, the link group 351 is disposed above the link head 301 and in parallel to the link group 350. Link lengths of the links 351A and 351B are set as the same size as that of each of the links 350A and 350B.

One link end portion of the link 351A is movably and pivotably linked to the slider guiding rail 363 disposed above the bed 10 in a position parallel to the slider guiding rail 360 through the slider 364 and the rotation joint 383. The other link end portion of the link 351A is movably and pivotably linked to the link head 301 through the linear joint 353 and the rotation joint 355. Also, the link 351A can be moved on the slider guiding rail 363 by the actuator 358 and can also be moved on the joint guiding rail 352 through the linear joint 353 and the rotation joint 355 by the actuator 358. Here, the rotation joint 383 functions as a joint which has one degree of freedom and which is rotated around the axis parallel to the y-axis.

One link end portion of the link 351B is movably and pivotably linked to the slider guiding rail 363 through the slider 365 and the rotation joint 384. The other link end portion of the link 351B is movably and pivotably linked to the link head 301 through the linear joint 353 and the rotation joint 355. The link 351B can be moved on the slider guiding rail 363 by the actuator 359, and can also come close to or be separated from the link 351A (the rotation joint 383) by the actuator 359. Also, the link 351B can be moved on the joint guiding rail 352 through the linear joint 353 and the rotation joint 355 by the actuator 359. Here, the rotation joint 384 functions as a joint which has one degree of freedom and which is rotated around the axis parallel to the y-axis.

Construction of Controller

As shown in FIG. 3, the controller 3 includes a central processing unit (CPU) 71, a memory 72, and interfaces (I/Fs) 73 to 75. The controller 3 converts command values U corresponding to information, on a movement position of the link head 301, which is given in accordance with the rectangular coordinate system into output values of the actuators 356 to 359 in accordance with mechanism parameters P, thereby driving-controlling the actuators 356 to 359

Structure of CPU

The CPU 71 reads out a processing program stored in either the memory 72 or an external storage unit 78, analyzes the processing program thus read out, converts information, on the movement position and posture of the link head 301, which is given in accordance with the rectangular coordinate system into driving command values for the actuators 356 to 359, respectively, in accordance with the mechanism parameters P, and outputs the resulting driving command values to a servo motor unit 80.

Structure of Memory

The various kinds of pieces of information such as the processing program in accordance with which the processing tool 501 carries out the actual processing, and the mechanism parameters P are stored in the memory 72.

Structure of Interfaces

The servo motor unit 80 (DUU1 81 to DUU4 84) for driving the actuators (servo motors) 356 to 359, respectively, is connected to the interface 73. The servo motor units 81 to 84 drive the actuators 356 to 359, respectively, in accordance with the command values issued from the CPU 71, and carry out feedback control in accordance with output values from motor rotation-detecting encoders 31 to 34 of the actuators 356 to 359. A keyboard (KB) 76 for inputting therethrough the processing data or the like, an image display device (CRT) 77 for displaying thereon the processing data, information on a state of the machine tool 1, or the like, and the external storage unit 78 for storing therein the processing data are connected to the interface 74. Also, a position sensor 380 is connected to the interface 75.

Construction of Attachments

The attachments include an oil supplying apparatus, a cooling system, an air supplying apparatus, and a coolant supplying apparatus, and a duct apparatus or the like through which these apparatuses and system are connected to the machine tool main body.

Operation of Machine Tool

Figure 4:
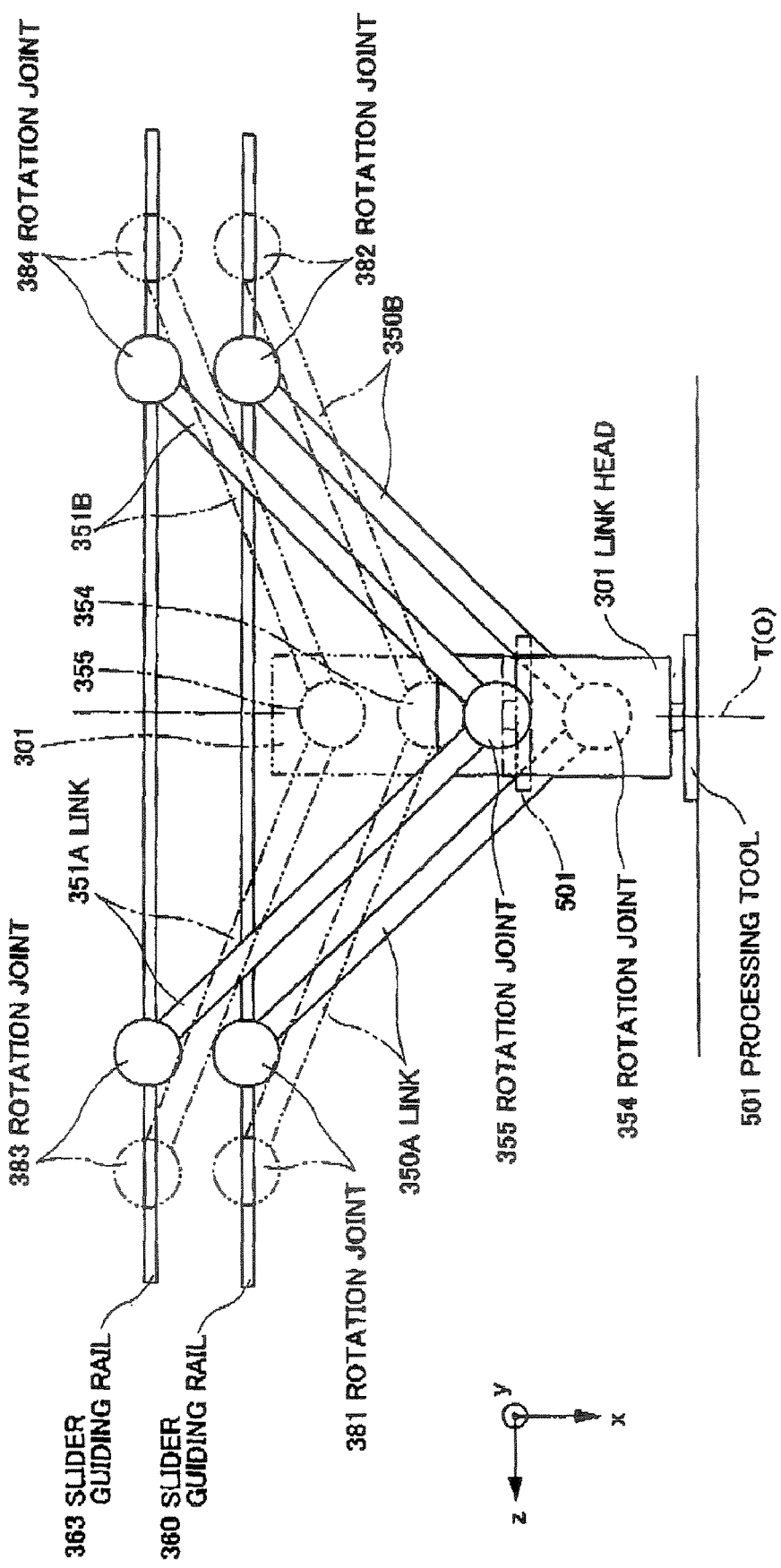
FIG. 4 is a plan view explaining an x-axis parallel operation of a link head in the machine tool according to the first embodiment of the invention.
Figure 5:
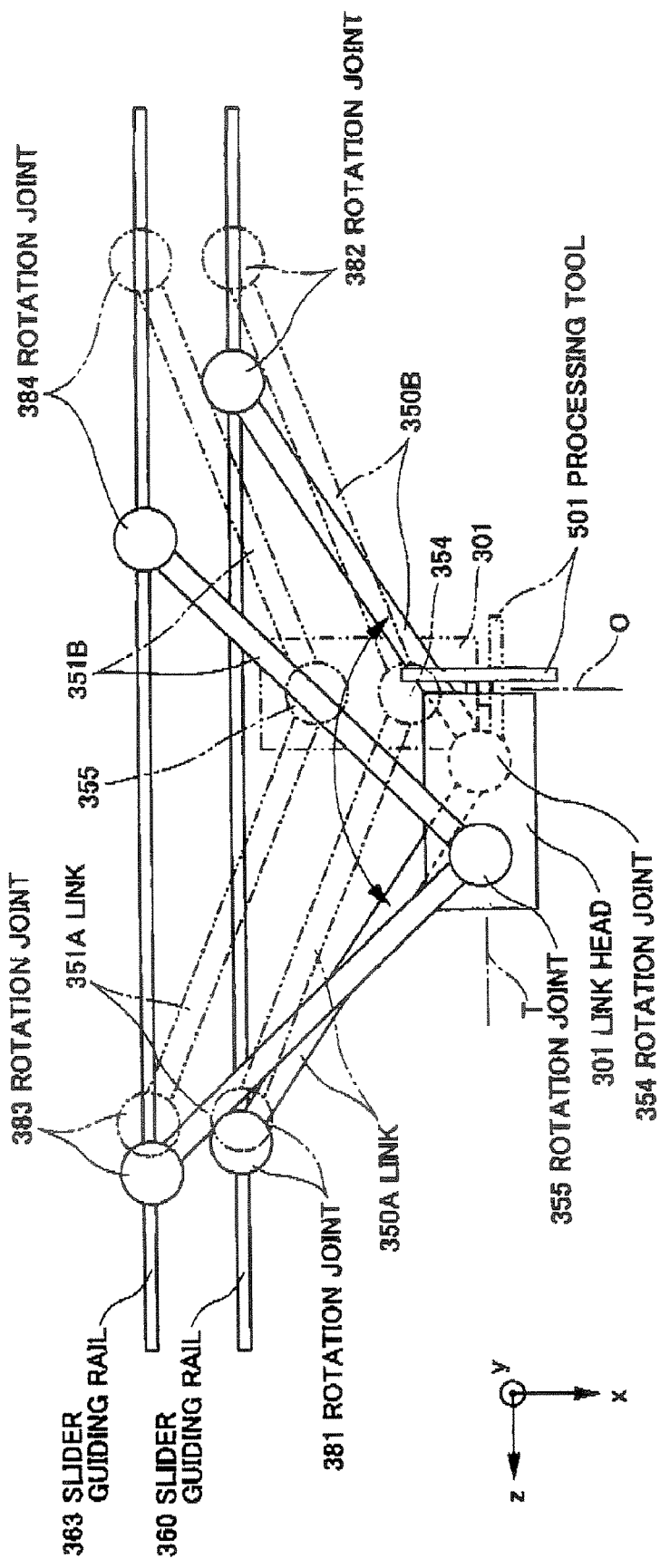
FIG. 5 is a plan view explaining a pivotal movement operation of the link head in the machine tool according to the first embodiment of the invention.
Figure 6:
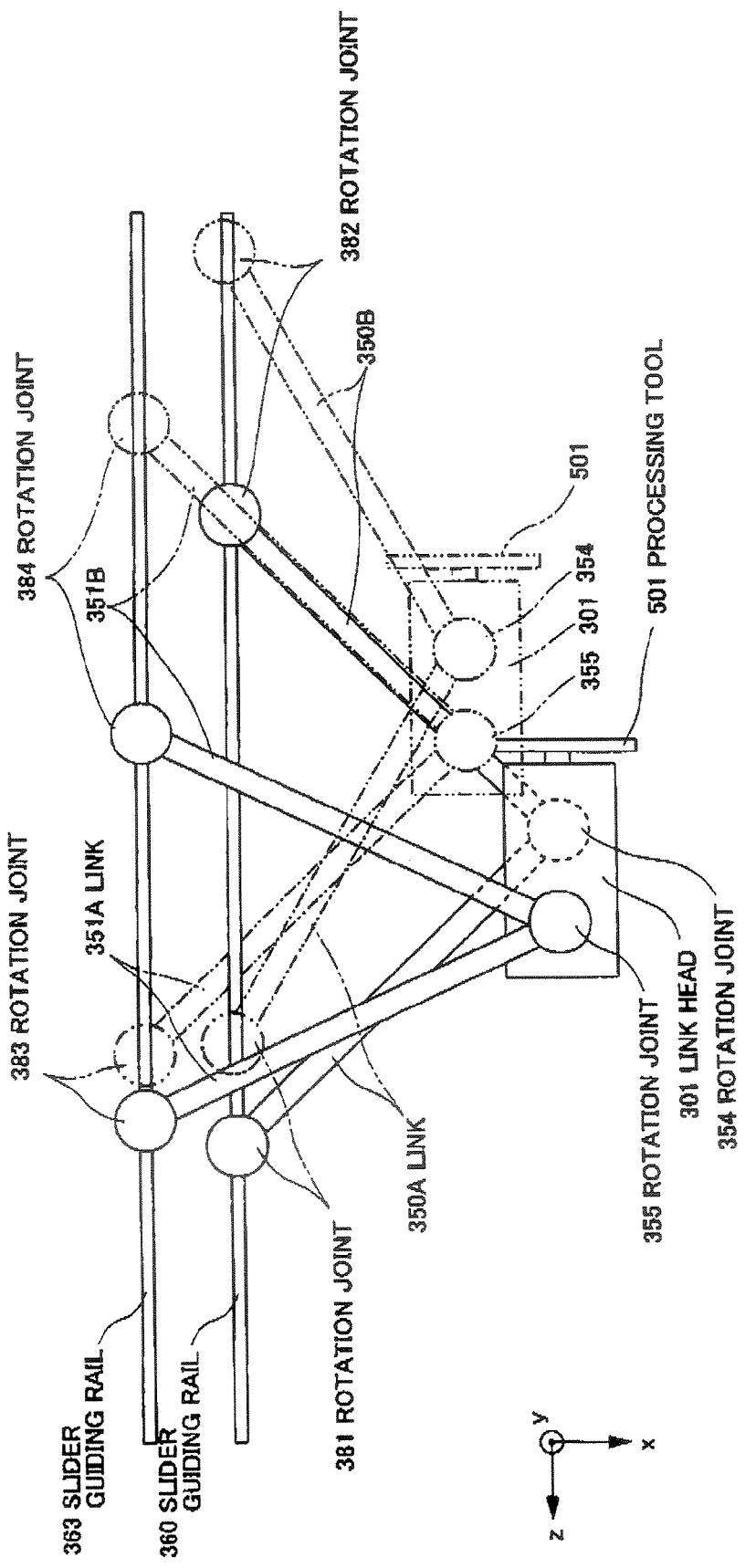
FIG. 6 is a plan view explaining an x-z-axes parallel operation of the link head in the machine tool according to the first embodiment of the invention.
Figure 7:
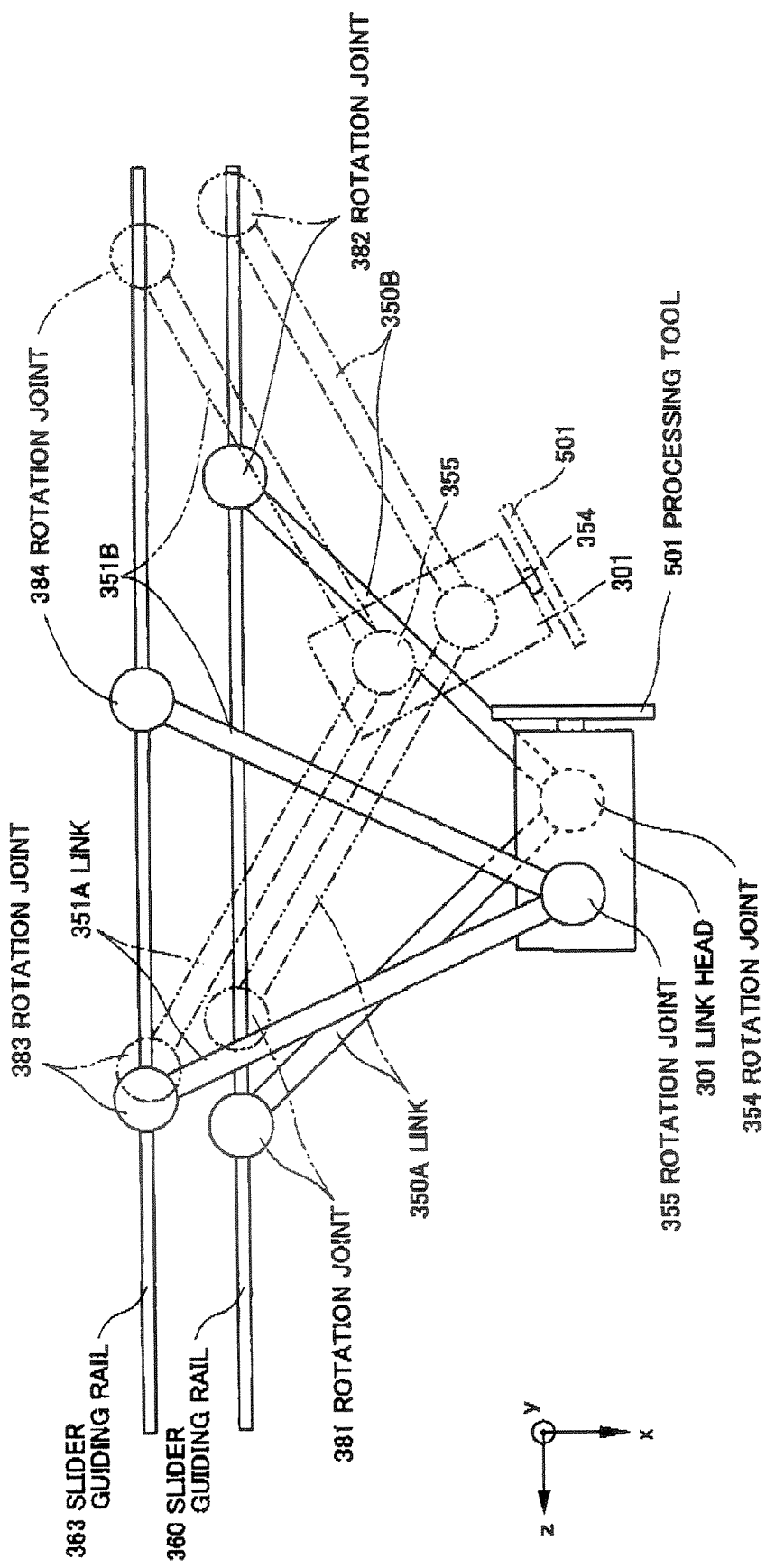
FIG. 7 is a plan view explaining an x-z-axes parallel and pivotal movement operation of the link head in the machine tool according to the first embodiment of the invention.

Next, an operation of the machine tool according to the first embodiment of the invention will now be described with reference to FIGS. 4 to 7. FIG. 4 is a plan view explaining an x-axis parallel operation of the link head in the machine tool according to the first embodiment of the invention. FIG. 5 is a plan view explaining a pivotal movement operation of the link head in the machine tool according to the first embodiment of the invention. FIG. 6 is a plan view explaining an x-z-axes parallel operation of the link head in the machine tool according to the first embodiment of the invention. Also, FIG. 7 is a plan view explaining an x-z-axes parallel and pivotal movement operation of the link head in the machine tool according to the first embodiment of the invention Note that, illustration of the linear joint 353 is omitted in each of FIGS. 4 to 7.

"x-Axis Parallel Operation"

When the rotation joints 381 and 382 (the sliders 361 and 362) are moved from their initial positions indicated by dashed lines in FIG. 4, respectively, along the slider guiding rail 360 in a direction of coming close to each other by the same amount, z1, of movement, and also the rotation joints 383 and 384 (the sliders 364 and 365) are moved from their initial positions indicated by dashed lines in FIG. 4, respectively, along the slider guiding rail 363 in a direction of coming close to each other by the same amount, $z2$ ($z1=z2$), of movement, the link head 361 is moved in the x-axis direction to be disposed in a position indicated by a solid line in FIG. 4 with the rotation axis T being aligned with a reference line O.

"Pivotal Movement Operation"

When the rotation joints 381 and 382 (the sliders 361 and 362) are moved from their initial positions indicated by dashed lines in FIG. 5 in the same direction (in the left-hand direction) by different amounts, $z1$ and $z2$ ($z2>z1$), of movement, respectively, and also the rotation joints 383 and 384 (the sliders 364 and 365) are moved from their initial positions indicated by dashed lines in FIG. 5 in the same direction (in the left-hand direction) by different amounts, $z3$ and $z4$ ($z4>z2>z3>z1$), of movement, respectively, the link head 301 is pivoted about the y-axis in a counterclockwise direction to be disposed in a position indicated by a solid line in FIG. 5, so that the rotation axis T of the processing tool 501, for example, makes a right angle with the reference line O.

"x-z-Axes Parallel Operation"

When the rotation joints 381 and 382 (the sliders 361 and 362) are moved from their initial positions indicated by solid lines in FIG. 6 in the same direction (in the right-hand direction) by the different amounts, z1 and z2 (z2>z1), of movement, respectively, and also the rotation joints 383 and 384 (the sliders 364 and 365) are moved from their initial positions indicated by solid lines in FIG. 6 in the same direction (in the right-hand direction) by the different amounts, z3 and z4 (z4>z2>z1>z3) of movement, respectively, the link head 301 is moved obliquely to be disposed in a position indicated by a dashed line in FIG. 6.

"x-z-Axes Parallel and Pivotal Movement Operation"

When the rotation joints 381 and 382 (the sliders 361 and 362) are moved from their movement positions indicated by solid lines in FIG. 7 in the same direction (in the right-hand direction) by the different amounts, z1 and z2 (z2>z1), of movement, respectively, and also the rotation joints 383 and 384 (the sliders 364 and 365) are moved from their movement positions indicated by solid lines in FIG. 7 in the same direction (in the right-hand direction) by the different amounts, z3 and z4 (z4>z2>z1>z3), of movement, respectively, the link head 301 is moved obliquely and at the same time is pivoted about the y-axis in a clockwise direction to be disposed in a position indicated by a dashed line in FIG. 7. In this case, an amount of movement of the rotation joint 384 (the slider 365) is set as being larger than that of the rotation joint 384 (the slider 365) in the case of "x-z-Axes Parallel Operation".

In the manner described above, in the first embodiment, the link head 301 is moved along the x-axis and z-axis, and also is pivoted about the y-axis, which results in that the position and posture of the link head 301 can be controlled and the work W held between the left- and right-hand side two headstocks 103 can be processed.

In this case, since the positions of the rotation joints 354 and 355 disposed on the lower and upper surfaces of the link head 301 are determined, respectively, when the sliders 361, 362, 364 and 365 are positioned, the movement and pivotal movement position of the link head 301 (the tip position of the processing tool 501) is determined. For this reason, in order to position the link head 301 in the desired movement and pivotal movement position, the positions of the sliders 361 and 362, and the sliders 364 and 365 are arithmetically operated in accordance with a specific operation expression (inverse conversion expression) from the movement and pivotal movement positions, and the sliders 361 and 362, and the sliders 364 and 365 are moved to the positions corresponding to the resulting arithmetic operation values, respectively.

Next, a description will now be given with respect to a procedure for obtaining the positions (the amounts of movement) of the sliders 361, 362, 364 and 365 by using a specific inverse conversion expression. Here, when the coordinates of the tip position of the processing tool 501 are expressed by (x, z, B), the coordinates $(x_1, z_1)$ of the rotation joint 354 and the coordinates $(x_2, z_2)$ of the rotation joint 355 are expressed as follows:

$$\begin{bmatrix} x_1 \\ z_1 \end{bmatrix} = \begin{bmatrix} \cos B & \sin B \\ -\sin B & \cos B \end{bmatrix} \begin{bmatrix} TO1_x \\ TO1_z \end{bmatrix} + \begin{bmatrix} x \\ z \end{bmatrix}$$

-continued $$\begin{bmatrix} x_2 \\ z_2 \end{bmatrix} = \begin{bmatrix} \cos B & \sin B \\ -\sin B & \cos B \end{bmatrix} \begin{bmatrix} TO2_x \\ TO2_z \end{bmatrix} + \begin{bmatrix} x \\ z \end{bmatrix}$$

Thus, the amounts, (the coordinates of the actuators), U=U $(U_1, U_2, U_3, U_4)$, of movement of the sliders 361, 362, 364 and 365 provided by driving the actuators 356 to 359 are obtained as follows, respectively:

The actuator coordinates: $U=(U_1,U_2,U_3,U_4)$ $$U_1 = -\{(x_1 - SLO1_x)\sin SLA1 + (z_1 - SLO1_z)\cos SLA1\} + \sqrt{\{(x_1 - SLO1_x)\sin SLA1 + (z_1 - SLO1_z)\cos SLA1\}^2 - \{(x_1 - SLO1_x)^2 + (z_1 - SLO1_z)^2 - RL1^2\}}$$

$$U_2 = -\{(x_1 - SLO2_x)\sin SLA2 + (z_1 - SLO2_z)\cos SLA2\} + \sqrt{\{(x_1 - SLO2_x)\sin SLA2 + (z_1 - SLO2_z)\cos SLA2\}^2 - \{(x_1 - SLO2_x)^2 + (z_1 - SLO2_z)^2 - RL2^2\}}$$

$$U_3 = -\{(x_2 - SLO3_x)\sin SLA3 + (z_2 - SLO3_z)\cos SLA3\} + \sqrt{\{(x_2 - SLO3_x)\sin SLA3 + (z_2 - SLO3_z)\cos SLA3\}^2 - \{(x_2 - SLO3_x)^2 + (z_2 - SLO3_z)^2 - RL3^2\}}$$

$$U_4 = -\{(x_2 - SLO4_x)\sin SLA4 + (z_2 - SLO3_z)\cos SLA4\} + \sqrt{\{(x_2 - SLO4_x)\sin SLA4 + (z_2 - SLO4_z)\cos SLA4\}^2 - \{(x_2 - SLO4_x)^2 + (z_2 - SLO4_z)^2 - RL4^2\}}$$

Figure 9:
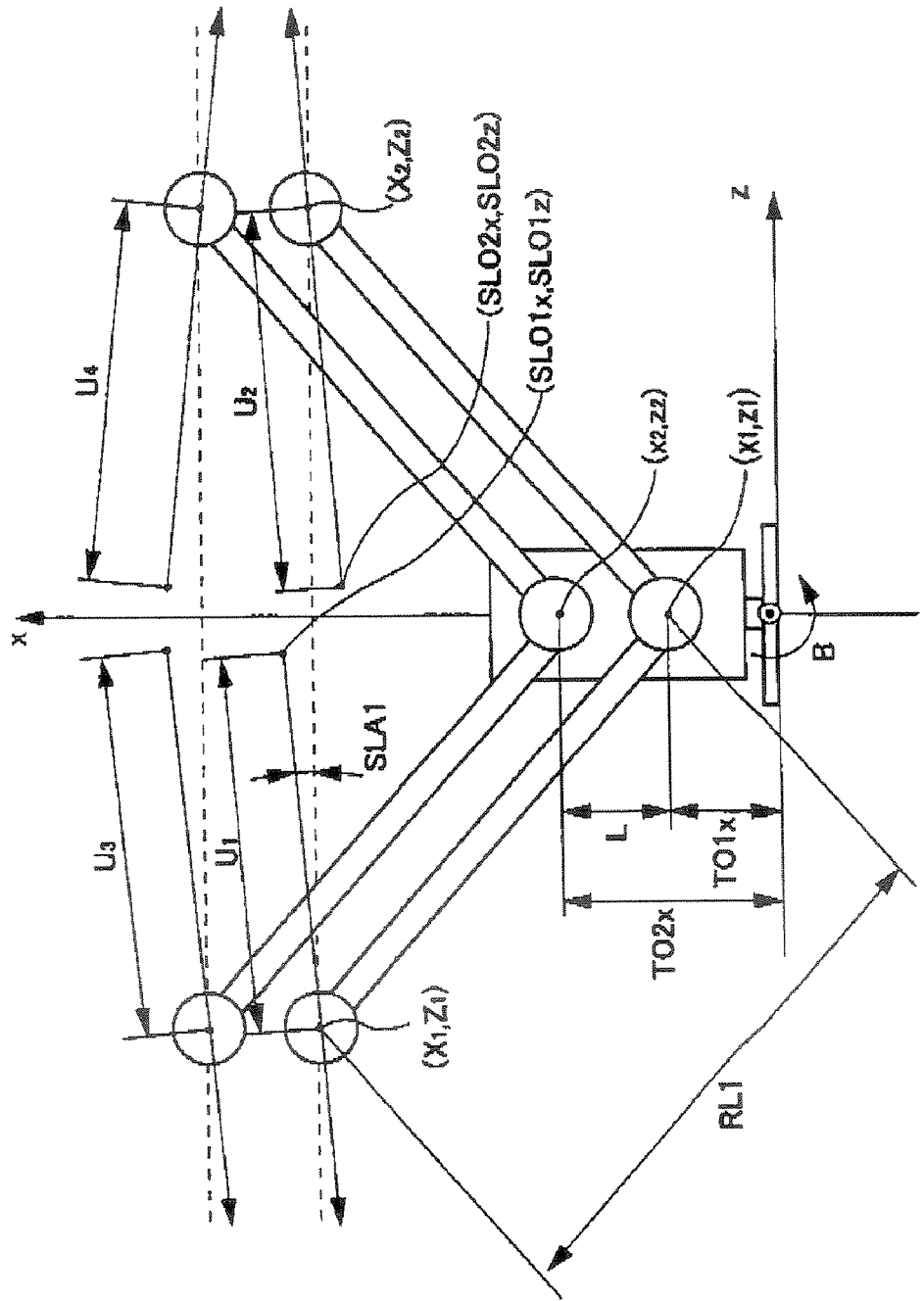
FIG. 9 is a plan view explaining a procedure for obtaining a position of a slider in the machine tool according to the first embodiment of the invention, and also explaining a calibration method for use in the machine tool according to the first embodiment of the invention.

Note that, the slide origin positions ($SLO1_x$, $SLO1_z$, $SLO2_x$, $SLO2_z$, $SLO3_x$, $SLO3_z$, $SLO4_x$, $SLO4_z$), the slide angles (SLA1, SLA2, SLA3, SLA4), and the link lengths (PL1, PL2, PL3, PL4<PL1=PL2=PL3=PL4 in the example of FIG. 9>) are the mechanism parameters P of the parallel mechanism 300 as shown in FIG. 9.

Figure 8A:
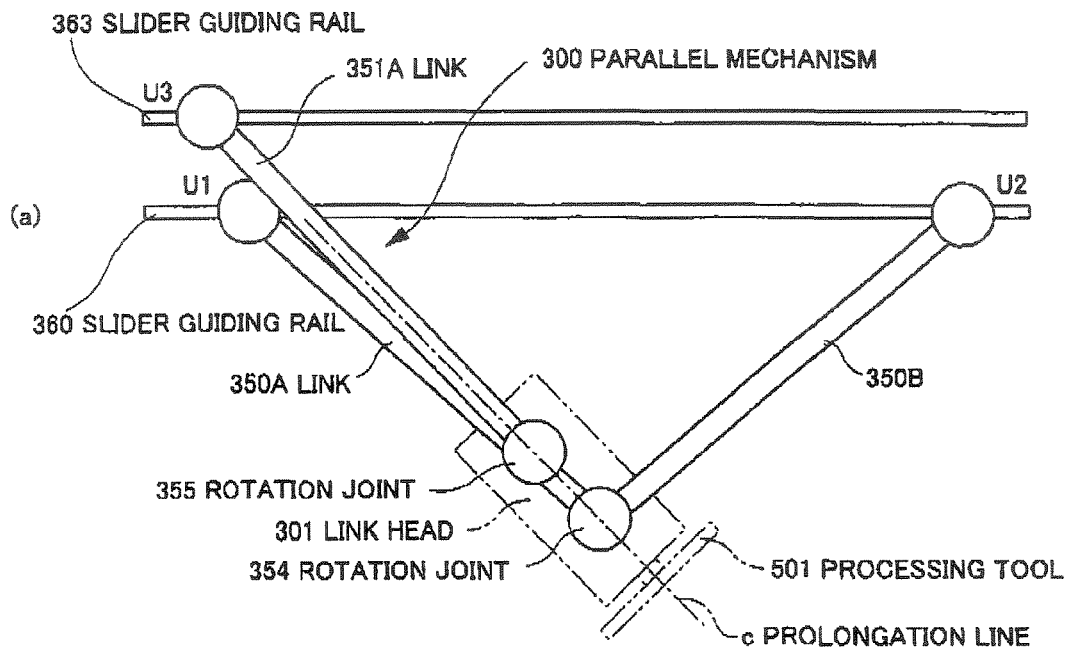
FIGS. 8A and 8B are respectively plan views explaining a merit which is more advantageous in the case of provision of four links than in the case of provision of three links.
Figure 8B:
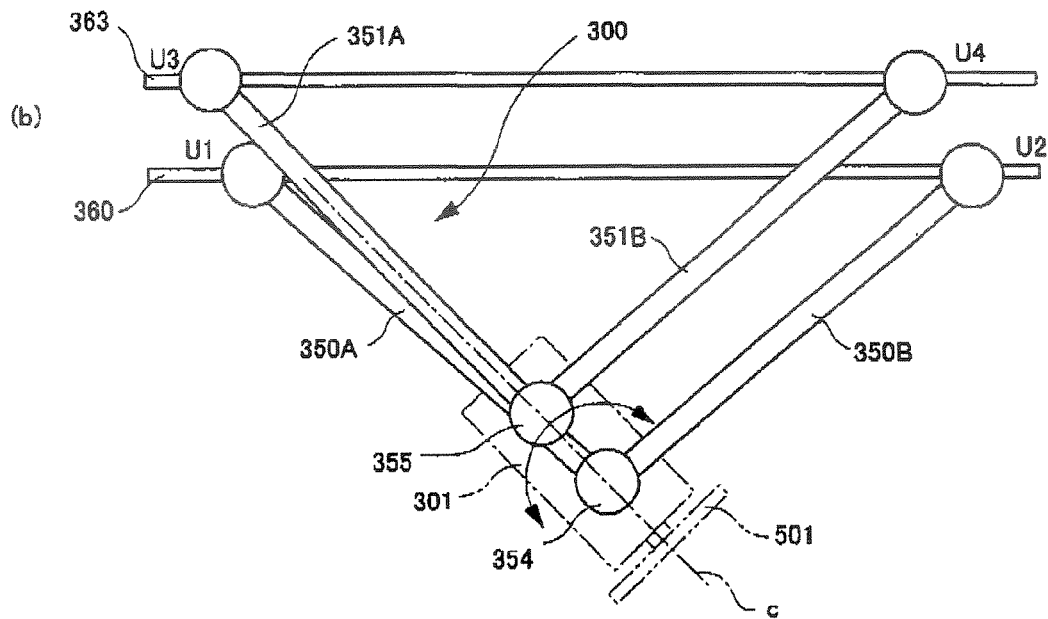

The positioning of the sliders 361 and 362, and the sliders 363 and 365 in the actuator coordinates U thus obtained makes it possible to control the position and posture of the link head 301. In this case, the linear joint 353 (refer to FIG. 2) is not theoretically displaced with respect to the link head 301. The reason for this is as follows. In the first embodiment, the link head 301 can perform the x-axis parallel operation, the z-axis parallel operation, and the operation of the pivotal movement about the y-axis. That is to say, the link head 301 can operate with the three degrees of freedom. In order that the link head 301 may attain the operation having the three degrees of freedoms it is the necessary and sufficient condition that as shown in FIG. 8A, the parallel mechanism includes three driving mechanisms (actuators) for driving the three links 350A, 350B and 350C, respectively. On the other hands as shown in FIG. 8B, the parallel mechanism 300 of the first embodiment includes the four driving mechanisms (the actuators 356 to 359) for driving the four links 350A and 350B, and 351A and 351B, respectively. In spite of the provision of the redundant driving mechanism, the presence of the redundant driving mechanism prevents the linear joint 353 from being directly displaced by the actuators 356 to 359. However, actually, the mechanism parameters P do not exactly follow the theoretical values, but contain therein the errors due to the manufacturing errors or the assembly errors of the constituent components or parts constituting the parallel mechanism 300, or the long term change resulting from the use environment such as the temperature change or the long term use. Hence, the linear joint 353 is displaced to absorb these errors.

In addition, another reason that the parallel mechanism 300 includes the redundant driving mechanism will now be described. The reason for this is because there is no singularity as the problem of the parallel mechanism. With the construction, shown in FIG. 8A, having no redundant degree of freedom, there is a so-called over singularity at which when a $U_3$-axis is intended to pivot the link head 301 thereabout with a $U_1$-axis and a $U_2$-axis being fixed, the $U_3$-axis cannot be moved in a state in which the link 351A is arranged on a line segment linking between the two rotation joints 354 and 355. On the other hand, in the first embodiment, there is no singularity because as shown in FIG. 8B, the parallel mechanism 300 has the redundant driving axis (the $U_4$-axis in this state).

According to the above-mentioned first embodiment of the invention, the following effects are obtained.

(1) Since the rotation joint 355 can be moved on the link head 301, it is possible to absorb the various kinds of errors due to the mechanism parameters P when the processing precision for the constituent components or parts, or the precision of assembly among the constituent components or parts is poor, and when the links 350A and 350B, and the links 351A and 351B are caused to expand and contract due to the thermal change in the phase of use or the like. Thus, it is possible to prevent the overload from being applied to the corresponding constituent components or parts and the actuators due to these size errors.

(2) Since the link groups 350 and 351 are disposed in parallel to each other through the link head 301, the links 350A and 350B, and the links 351A and 351B are prevented from crossing each other. As a result, the pivotal movement angles of the links 350A and 350B, and the links 351A and 351B can be set as sufficiently large angles, respectively, and thus the desired movement and pivotal movement operation (the pivotal movement range is equal to or larger than 360°) can be obtained as the movement and pivotal movement operation of the link head 301.

(3) Since the link head 301 is supported in the cantilever style to the bed (riser member) 10 by the link groups 350 and 351, it is possible to reduce the installation space for the link groups 350 and 351, and the slider guiding rails 360 and 363. As a result, it is possible to miniaturize the overall parallel mechanism.

Second Embodiment

Figure 10:
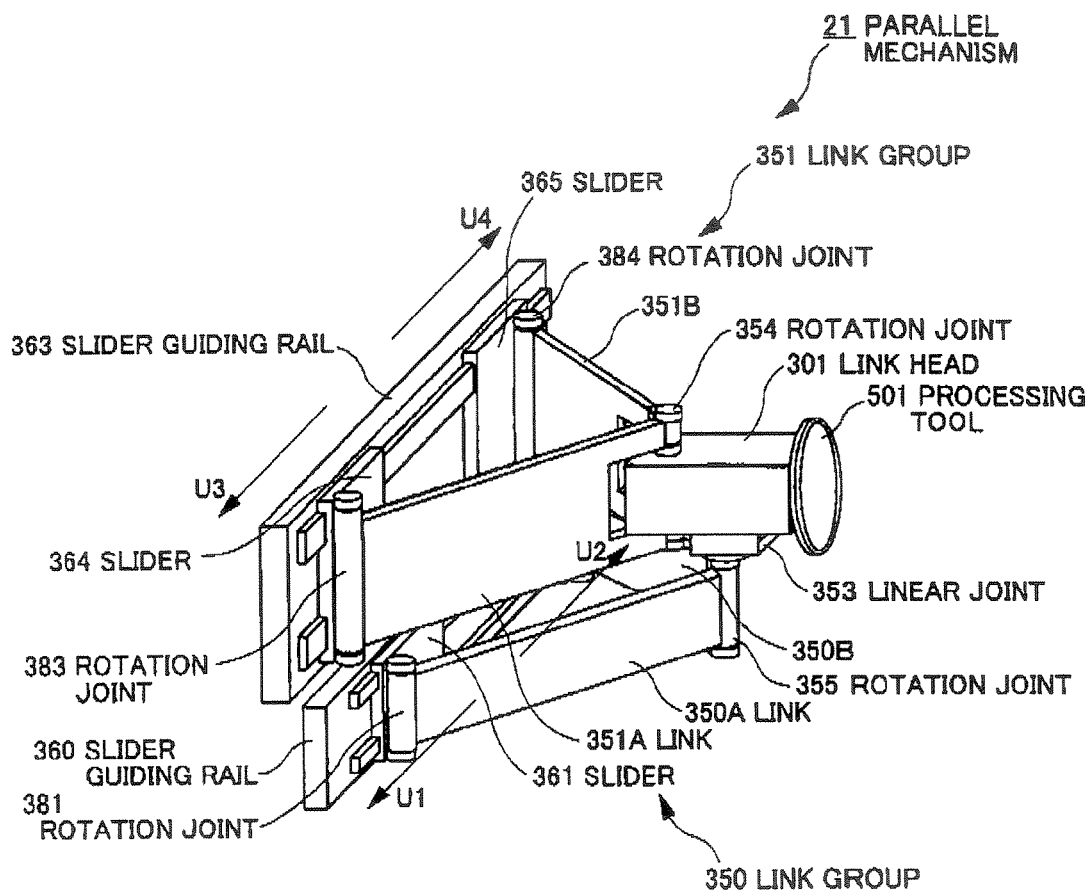
FIG. 10 is a perspective view explaining a parallel mechanism according to a second embodiment of the invention.

FIG. 10 is a perspective view explaining a parallel mechanism according to a second embodiment of the invention. In FIG. 10, the same or equal members are designated by the same reference numerals as used in FIG. 2 and a detailed description thereof is omitted below for simplicity.

As shown in FIG. 10, a parallel mechanism 21 according to the second embodiment of the invention has the feature that link groups 350 and 351 are disposed in positions, respectively, where the movement and pivotal movement virtual plane of a link head 301 is set as a horizontal plane, and gravity (y-axis) direction sizes of the links 350A and 350, and the links 351A and 351B are set as wide sizes, respectively, (the links 350A and 350B, and the links 351A and 351B are plate-shaped members each having a thickness in the y-axis direction).

For this reason, slider guiding rails 360 and 363 are disposed in parallel to each other in the gravity direction, and are constructed so as to guide sliders 361 and 362, and sliders 354 and 365, respectively, in a horizontal direction. Head link side end portions of the links 351A and 351B are pivotably linked to a rotation joint 354 so as to hold the link head 301 between them. Also, rail side end portions of the links 351A and 351B are movably and pivotably linked to the slider guiding rail 363 through the sliders 364 and 365, and the rotation joints 383 and 384. In addition, head link side end portions of the links 350A and 350B are movably and pivotably linked to the link head 301 through a linear joint 353 and a rotation joint 355. Also, rail side end portions of the links 351A and 351B are movably and pivotably linked to the slider guiding rail 360 through the sliders 361 and 362, and the rotation joints 381 and 382 (only the rotation joint 381 is illustrated in FIG. 10).

According to the above-mentioned second embodiment of the invention, the following effects are obtained in addition to the effects (1) to (3) of the first embodiment of the invention.

Since the gravity (y-axis) direction sizes of the links 350A and 350B, and the links 351A and 351B are set as the wide sizes, respectively, it is possible to suppress the deflection of the links 350A and 350B, and the links 351A and 351B in the gravity direction, and it also is possible to reduce the positioning error or the like due to the deflection of the links 350A and 350B, and the links 351A and 351B.

It should be noted that although in the second embodiment, the description has been given with respect to the case where the links 350A and 350B, and the links 351A and 351B are the plate-shaped members each having the thickness in the y-axis direction, the invention is not intended to be limited thereto, and thus the links 350A and 350B, and the links 351A and 351B may also be adopted as long as at least one of them is the plate-shaped member having the thickness in the y-axis direction.

Third Embodiment

Figure 11:
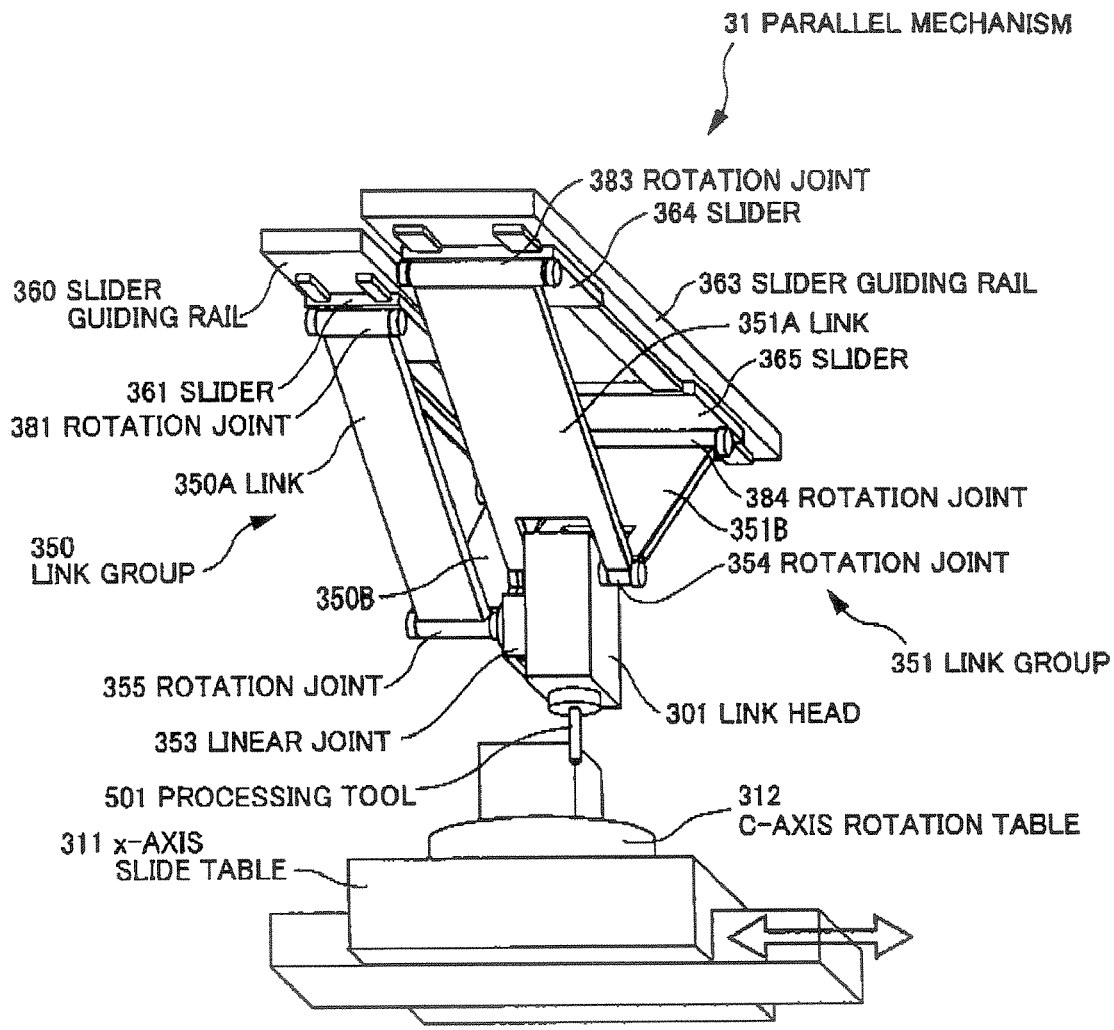
FIG. 11 is a perspective view explaining a parallel mechanism according to a third embodiment of the invention.
Figure 11:
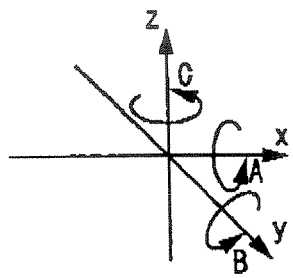

FIG. 11 is a perspective view explaining a parallel mechanism according to a third embodiment of the invention. In FIG. 11, the same or equal members are designated by the same reference numerals as used in FIG. 2 and a detailed description thereof is omitted below for simplicity.

As shown in FIG. 11, a parallel mechanism 31 according to the third embodiment of the invention has the feature that link groups 350 and 351 are disposed in positions, respectively, where the movement and pivotal movement virtual plane of a link head 301 is set as a vertical plane (with the y-axis as a horizontal line).

For this reason, slider guiding rails 360 and 363 are disposed in parallel to each other in the horizontal (x-axis) direction, and are constructed so as to guide sliders 361 and 362, and sliders 364 and 365 (the slider 362 is not illustrated in FIG. 11) in the horizontal direction. Head link side end portions of the links 351A and 351B are linked to a rotation joint 354 so as to hold the link head 301 between them. Also, rail side end portions of the links 351A and 351B are movably and pivotably linked to the slider guiding rail 363 through the sliders 364 and 365, and rotation joints 383 and 384. In addition, head link side end portions of the links 350A and 350B are movably and pivotably linked to the link head 301 through a linear joint 353 and a rotation joint 355. Also, rail side end portions of the links 351A and 351B are movably and pivotably linked to the slider guiding rail 360 through the sliders 361 and 362, and rotation joints 381 and 382 (only the rotation joint 381 is illustrated in FIG. 10). An x-axis slide table 311 which can be moved in the x-axis direction, and a C-axis rotation table 312 which can be rotated around the z-axis are disposed below the parallel mechanism 31.

According to the above-mentioned third embodiment of the invention, the following effects are obtained in addition to the effects (1) to (3) of the first embodiment of the invention.

Since the x-axis slide table 311 and the C-axis rotation table 312 are disposed below the parallel mechanism 31, a five-axes machine tool (a processing tool an end mill) having an angle movable range about an A-axis and a C-axis can be constructed while the high speed property of the parallel mechanism 31 is utilized. In this case, a B-axis rotation table which is rotated around the y-axis may be used instead of the C-axis rotation tool 312, and such a construction that causes the overall parallel mechanism 31 to directly act in the x-axis direction may be used instead of adopting the construction of the x-axis slide table 311.

Fourth Embodiment

Figure 12:
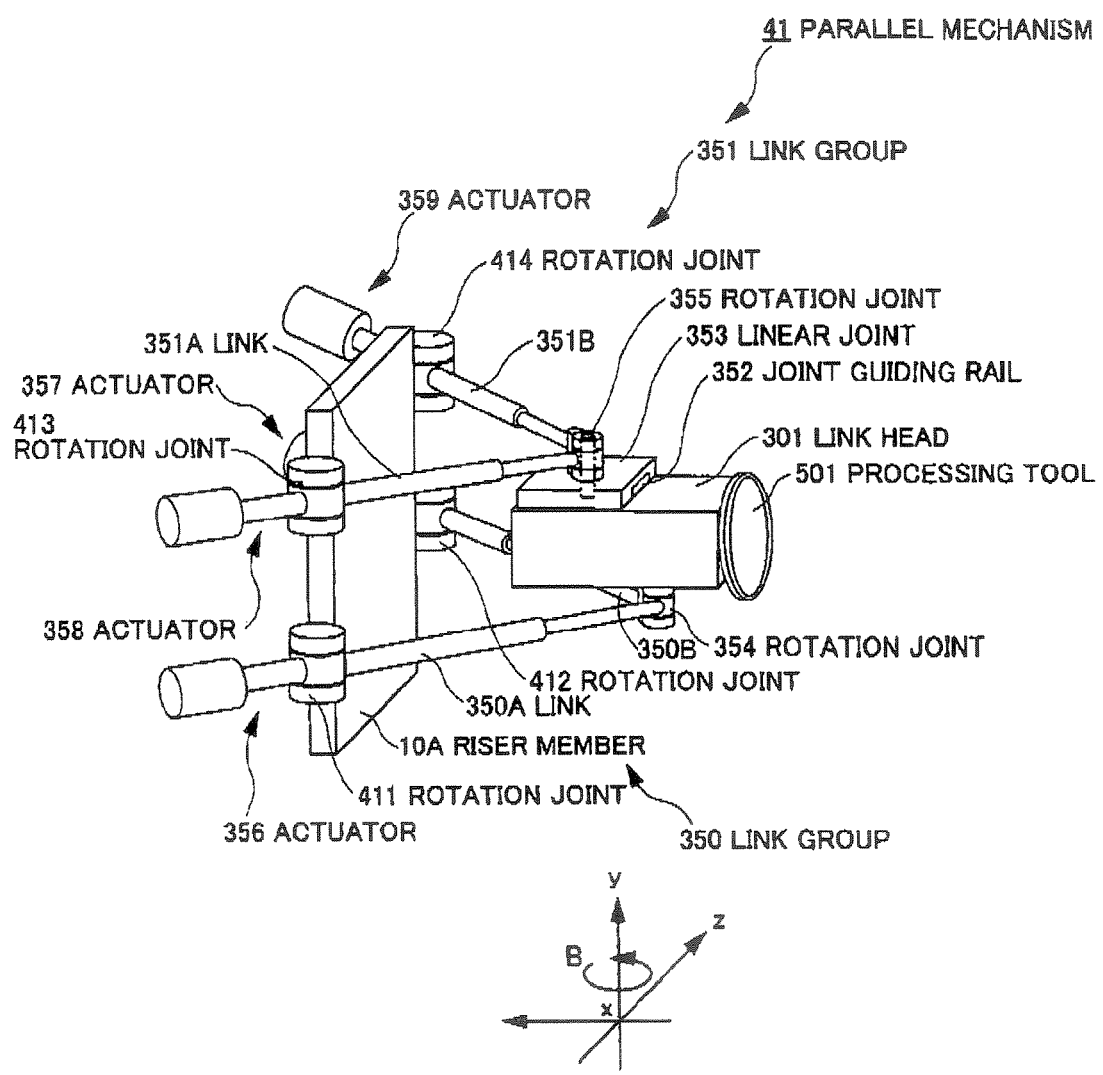
FIG. 12 is a perspective view explaining a parallel mechanism according to a fourth embodiment of the invention.

FIG. 12 is a perspective view explaining a parallel mechanism according to a fourth embodiment of the invention. In FIG. 12, the same or equal members are designated by the same reference numerals as used in FIG. 2 and a detailed description thereof is omitted below for simplicity.

As shown in FIG. 12, a parallel mechanism 41 according to the fourth embodiment of the invention has the feature that links 350A and 350B of a link group 350, and links 351A and 351B of a link group 351 can expand and contract in a longitudinal direction of each link.

For this reason, actuators 356 to 359 are constituted by expansion actuators which cause effective lengths of links 350A and 350B, and links 351A and 351B to expand and contract, and are mounted to a riser member 10A on the bed 10 (refer to FIG. 1) through rotation joints 411 to 414, respectively.

According to the above-mentioned fourth embodiment of the invention, the following effects are obtained in addition to the effects (1) to (3) of the first embodiment of the invention.

Since the expansion actuators which cause the links 350A and 350B, and the links 351A and 351B to expand and contract are used as the actuators 356 to 359, respectively, it is possible to reduce the installation space for the actuators 356 to 359. As a result, it is possible to miniaturize the overall parallel mechanism 41.

Fifth Embodiment

Figure 13:
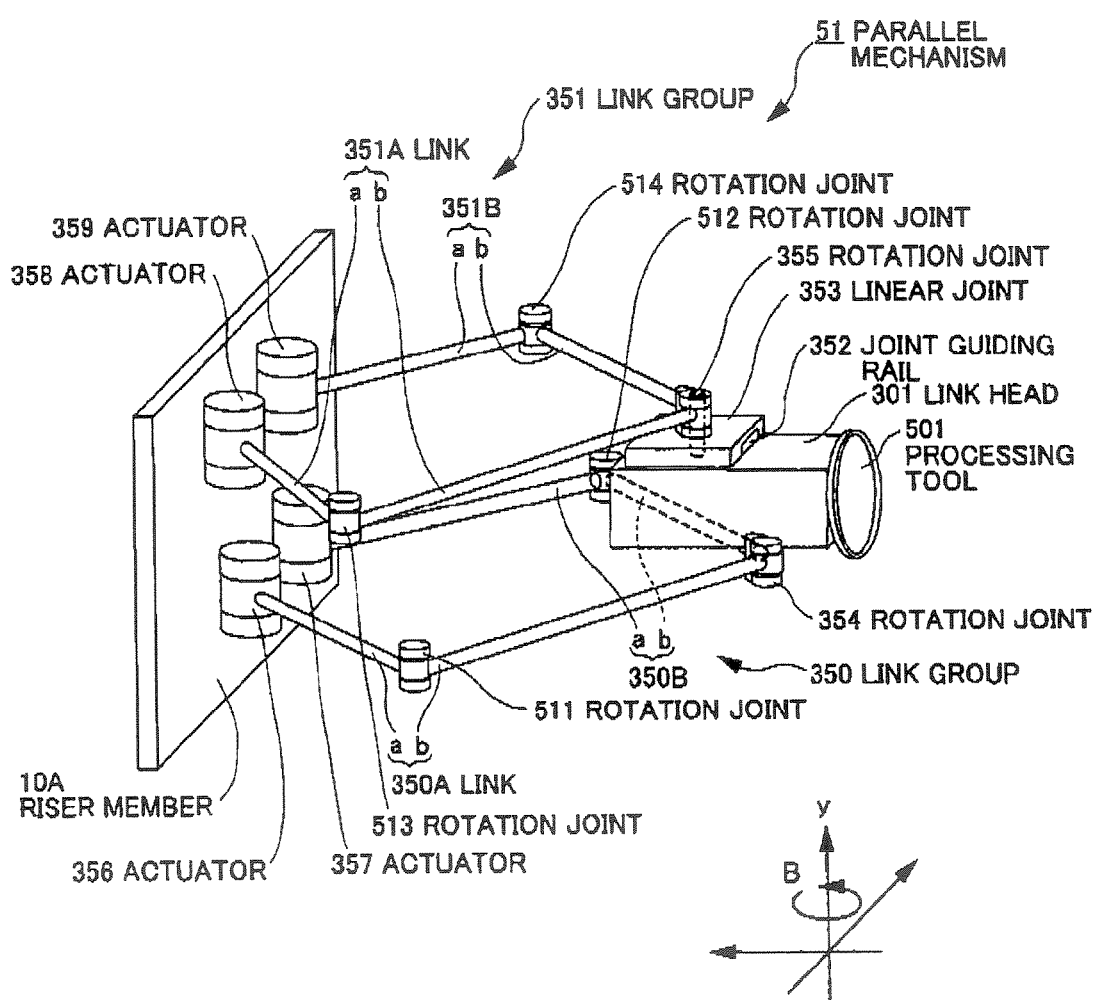
FIG. 13 is a perspective view explaining a parallel mechanism according to a fifth embodiment of the invention.

FIG. 13 is a perspective view explaining a parallel mechanism according to a fifth embodiment of the invention. In FIG. 13, the same or equal members are designated by the same reference numerals as used in FIG. 2 and a detailed description thereof is omitted below for simplicity.

As shown in FIG. 13, a parallel mechanism 51 according to the fifth embodiment of the invention has the feature that each of links 350A and 350B, and links 351A and 351B of the link groups 350 and 351 is constituted by a pair of link elements a and b, and the pairs of link elements a and b of the links 350A and 350B are pivotably linked to each other through rotation joints 511 and 512, and the pairs of link elements a and b of the links 351A and 351B are pivotably linked to each other through rotation joints 513 and 514.

For this reason, actuators 356 and 357, and actuators 358 and 359 are constituted by motors for pivoting the link elements a of the links 350A and 350B, and motors for pivoting the link elements a of the links 351A and 351B, respectively, and are mounted to a riser member 10A on the bed 10 (See FIG. 1).

According to the above-mentioned fifth embodiment of the invention, the following effects are obtained in addition to the effects (1) to (3) of the first embodiment of the invention.

Since the rotation motors for pivoting the link elements a of the links 350A and 350B, and the rotation motors for pivoting the link elements a of the links 351A and 351B are used as the actuators 356 and 357, and the actuators 358 and 359, respectively, it is possible to reduce the installation space for the actuators 356 to 359. As a result, it is possible to miniaturize the overall parallel mechanism 51.

Sixth Embodiment

Figure 14:
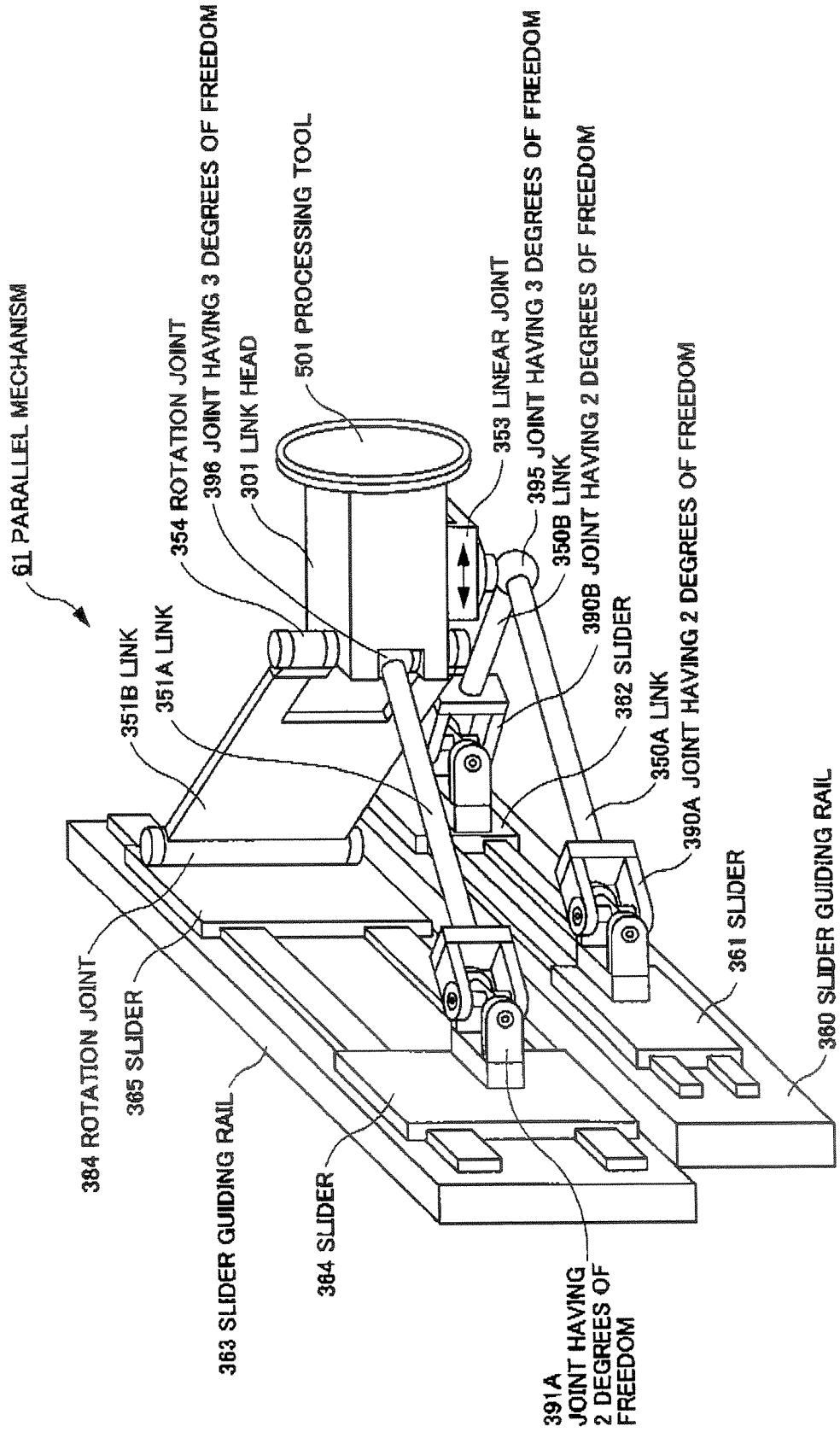
FIG. 14 is a perspective view explaining a parallel mechanism according to a sixth embodiment of the invention.

FIG. 14 is a perspective view explaining a parallel mechanism according to a sixth embodiment of the invention. In FIG. 14, the same or equal members are designated by the same reference numerals as used in FIG. 2, and a detailed description thereof is omitted below for simplicity.

As shown in FIG. 14, a parallel mechanism 61 according to the sixth embodiment of the invention has the feature that links 350A and 350B, and links 351A and 351B are disposed between a link head 301, and the actuators 356 and 357 (See FIG. 3), and between the link head 301 and the actuators 358 and 359 (See FIG. 3), respectively, through joints each having one degree of freedom, two degrees of freedom, or three degrees of freedom.

For this reason, rotation joints 354 and 384 as joints each of which has one degree of freedom and each of which is rotated around an axis parallel to the y-axis are mounted to both end portions of a link 351B, respectively. In addition, joints 390A, 390B and 391A each of which has two degrees of freedom and each of which is typified by a universal joint are mounted to one ends (rail side end portions) of links 350A, 350B and 351A, respectively. Also, joints 395 and 396 each of which has three degrees of freedom and each of which is typified by a spherical joint are mounted to the other ends (link head side end portions) of the links 350A (350B) and 351A, respectively.

According to the above-mentioned sixth embodiment of the invention, the same effects as those (1) to (3) of the first embodiment of the invention are obtained. In particular, the above-mentioned sixth embodiment of the invention is effective when an influence of the errors is exerted on the y-axis direction (the rotation around the x-axis, and the rotation around the z-axis).

Note that, in the above-mentioned sixth embodiment, the description has been given with respect to the case where the joints (the rotation joints 354 and 384) each of which has the one degree of freedom and each of which is rotated around the axis parallel to the y-axis are mounted to the both ends of the link 351B, respectively, in order to regulate the number of degrees of freedom of the link head 301 in the y-axis direction. However, the invention is not intended to be limited thereto. That is to say, these joints may also be disposed between the both ends of any one of other links 350A and 350B, and 351A and 351B. In addition, these joints may also be disposed between the both ends of two or three links of the links 350A and 350B, and the links 351A and 351B. In a word, the joint which has one degree of freedom and which can be pivoted about the axis parallel to the y-axis must be disposed between the both ends of at least one of the links 350A and 350B, and the links 351A and 351B. In this case, any one of at least the joint having two degrees of freedom and the joint having three degrees of freedom each of which can be pivoted about the axis parallel to the y-axis can be suitably selected and disposed between the both ends of the link other than at least one link including the joint having one degree of freedom.

Although the machine tool of the invention has been described so far based on the first to sixth embodiments, the invention is not intended to be limited to the first to sixth embodiments, and thus the various changes and modifications thereof can be implemented without departing from the gist of the invention. For example, changes as shown below can be made.

(1) In each of the first to sixth embodiments of this invention, the description has been given with respect to the case where in order to commonize the components or parts by setting the link lengths of the links 350A and 350B, and the links 351A and 351B as the same size, the slider guiding rails 360 and 363 are disposed in parallel to each other with being separated from each other in the x-axis direction as well as in the y-axis direction. However, according to the invention, the slider guiding rails 360 and 363 do not need to be separated from each other in the x-axis direction. Thus, both the slider guiding rails 360 and 363 may also be mounted in the same plane to the bed (riser member) 10.

(2) Although in each of the first to sixth embodiments of the invention, the description has been given with respect to the case where the rotation joints 354 and 355 are disposed on the side portions (the upper and lower side portions, or the left- and right-hand side portions) of the link head 301, respectively, the invention is not intended to be limited thereto, and thus both the rotation joints 354 and 355 may also be disposed on one side portion of the link head 301.

(3) Although in each of the first to sixth embodiments of the invention, the description has been given with respect to the parallel mechanism in which the processing tool 501 as an object for control is held by the link head 301 through the tool spindle unit 200, the invention is not intended to be limited thereto, and thus the invention may also be applied to a parallel mechanism in which the work is held by the link head.

(4) Although in each of the first to sixth embodiments of the invention, the description has been given with respect to the case where the link groups 350 and 351 are disposed on the two parallel virtual planes, respectively, the invention is not intended to be limited thereto, and thus the link groups 350 and 351 may also be disposed on a common virtual plane.

(5) Although in each of the first to sixth embodiments of the invention, the description has been given with respect to the case where the invention is applied to the machine tool 1 in which the grinding wheel or the end mill is used as the processing tool 501, the invention is not intended to be limited thereto. That is to say, it is to be understood that the invention may also be applied to any other suitable machine tool in which a cutting tool such as an electrodeposition wheel for cutting, or a heat treatment tool such as a laser quenching head, a surface finishing tool or the like is used as the processing tool.

(6) In each of the first to sixth embodiments of the invention, the description has been given with respect to the parallel mechanism 300 including the link head 301 (which can perform the x-z-axes movement operation and the y-axis pivotal movement operation) having the three degrees of freedom consisting of the straight line two axes and the rotation one axis, the four actuators (driving mechanisms) 356 to 359 for driving the link head 301, the link groups (link mechanisms) 350 and 351 including the four links 350A and 350B, and 351A and 351B connected to these actuators 356 to 359, respectively, and the rotation joint 355 (the joint 395 having the three degrees of freedom in the sixth embodiment), as the connection portion between the link head 301 and the link mechanisms 350 and 351, which can be moved on the link head 301 by driving the linear joint (slave connection portion) 353. However, the invention is not intended to be limited thereto. That is to say, the invention may be applied to a parallel mechanism as long as the parallel mechanism is adapted to control at least one of pivotal movement and linear movement of a link head having N (N: natural number) degrees of freedom, and includes (N+1) driving mechanisms for driving the link head, and a link mechanism including (N+1) links connected to the (N+1) driving mechanisms, respectively, the link mechanism being connected to the link head, in which one of connection portions interposed between the link mechanism and the link head is made a slave connection portion which is connected to the link head so as to be relatively movable in one axis direction.

Calibration Method for Use in Machine Tool

Next, a calibration method for use in the machine tool 1 according to the first embodiment of the invention will now be described with reference to FIGS. 9 and 15. FIG. 9 is a plan view explaining a calibration method for use in the machine tool according to the first embodiment of the invention. Also, FIG. 15 is a flow chart explaining the calibration method for use in the machine tool (parallel mechanism) according to the first embodiment of the invention.

The controller 3 of the machine tool 1 according to the first embodiment of the invention converts the command values (X, Z, B) corresponding to the information, on the movement position of the link head 301, given in accordance with the rectangular coordinate system into the output values of the actuators 356 to 359 in accordance with the mechanism parameters P (the slide origin positions; $SLO1_x$, $SLO1_z$, $SLO2_x$, $SLO2_z$, $SLO3_x$, $SLO3_z$, $SLO4_x$, $SLO4_z$, the slide angles: SLA1, SLA2, SLA3, SLA4, and the link lengths: RL1, RL2, RL3, RL4) to obtain the actuator coordinates $U(U_1, U_2, U_3, U_4)$, thereby driving and controlling the actuators 356 to 359. In this case, the calibration for the mechanism parameters P is carried out at predetermined intervals or at arbitrary timing through a procedure which will be shown below.

The position sensor 310 measures the displacement of the linear joint 353 having the function of absorbing the errors of the mechanism parameters P, that is, an error dL of a distance L between both the rotation joints 354 and 355, and the errors of the mechanism parameters P are obtained using the error dL, thereby carrying out the calibration in this embodiment.

Figure 15:
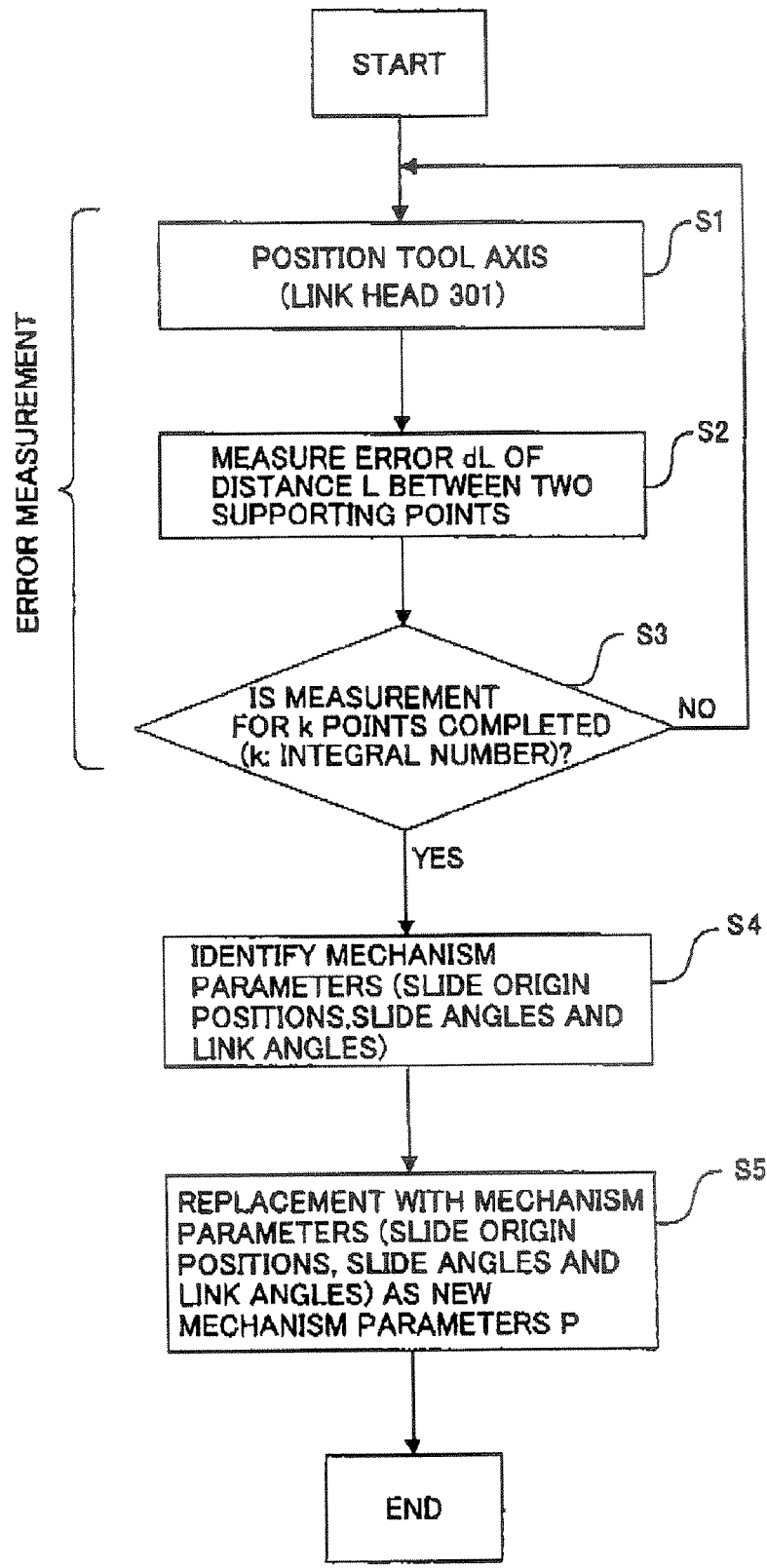
FIG. 15 is a flow chart explaining the calibration method for use in the machine tool according to the first embodiment of the invention.
Figure 16:
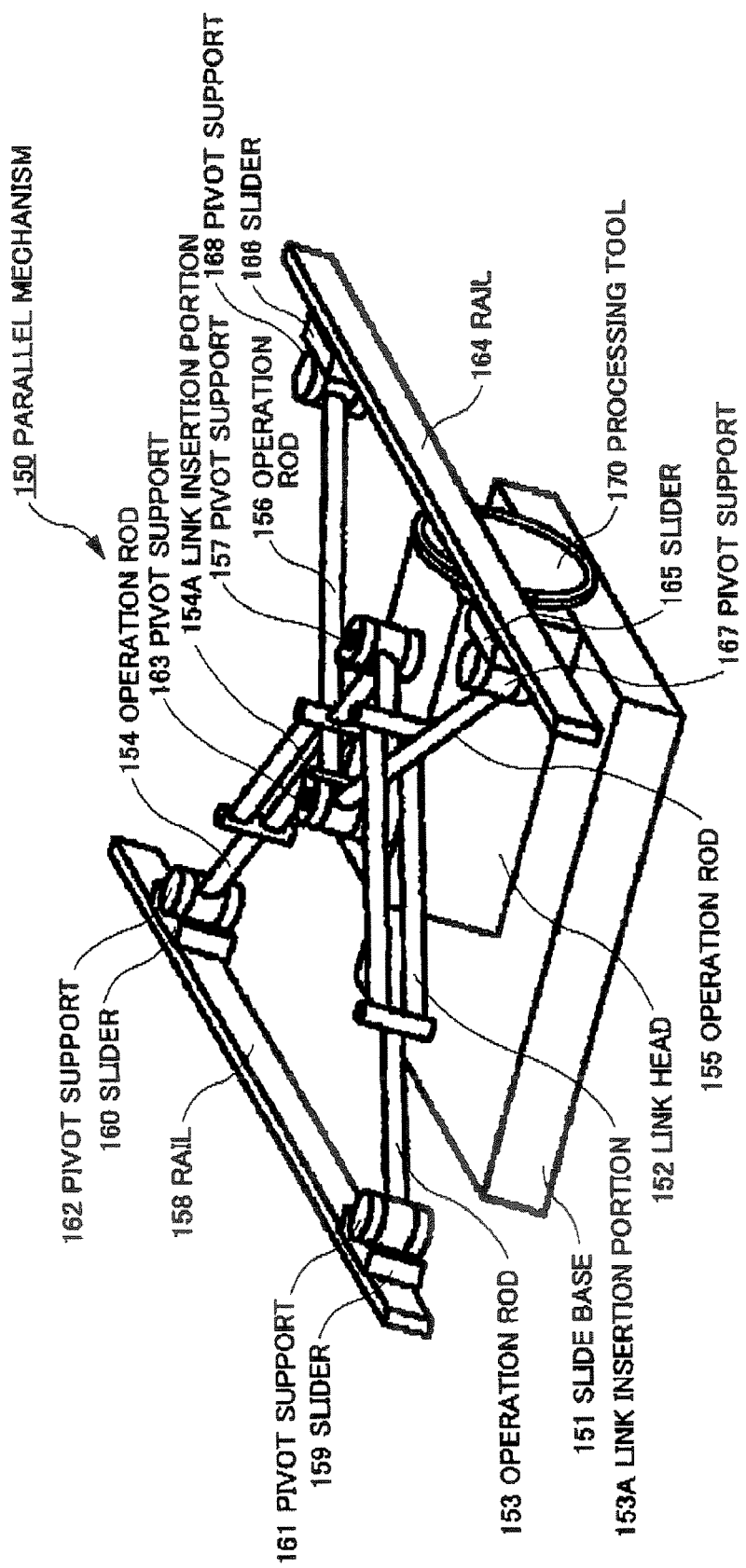
FIG. 16 is a perspective view explaining a conventional parallel mechanism.
Figure 17:
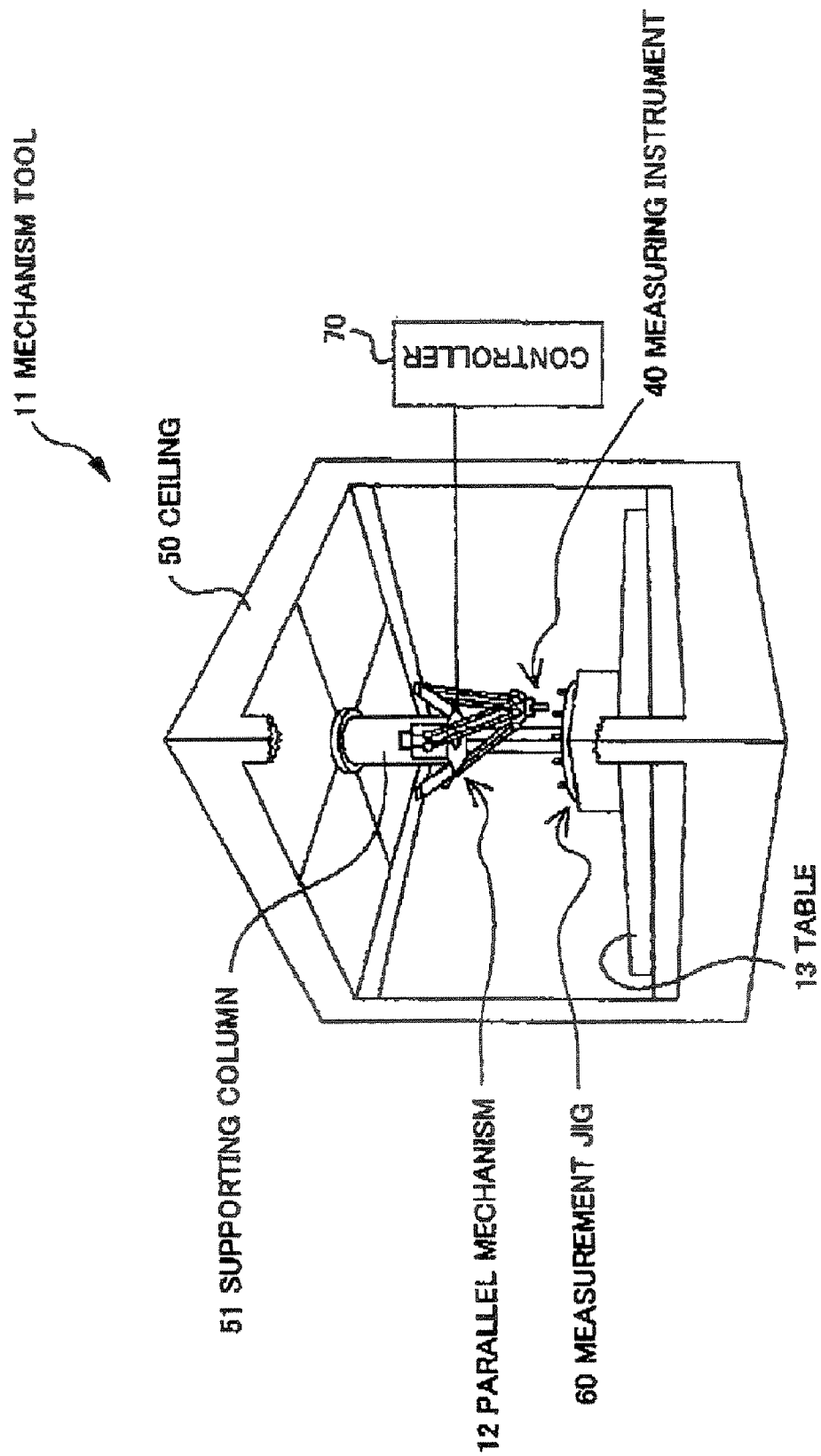
FIG. 17 is a perspective view explaining a conventional machine tool (1)
Figure 18:
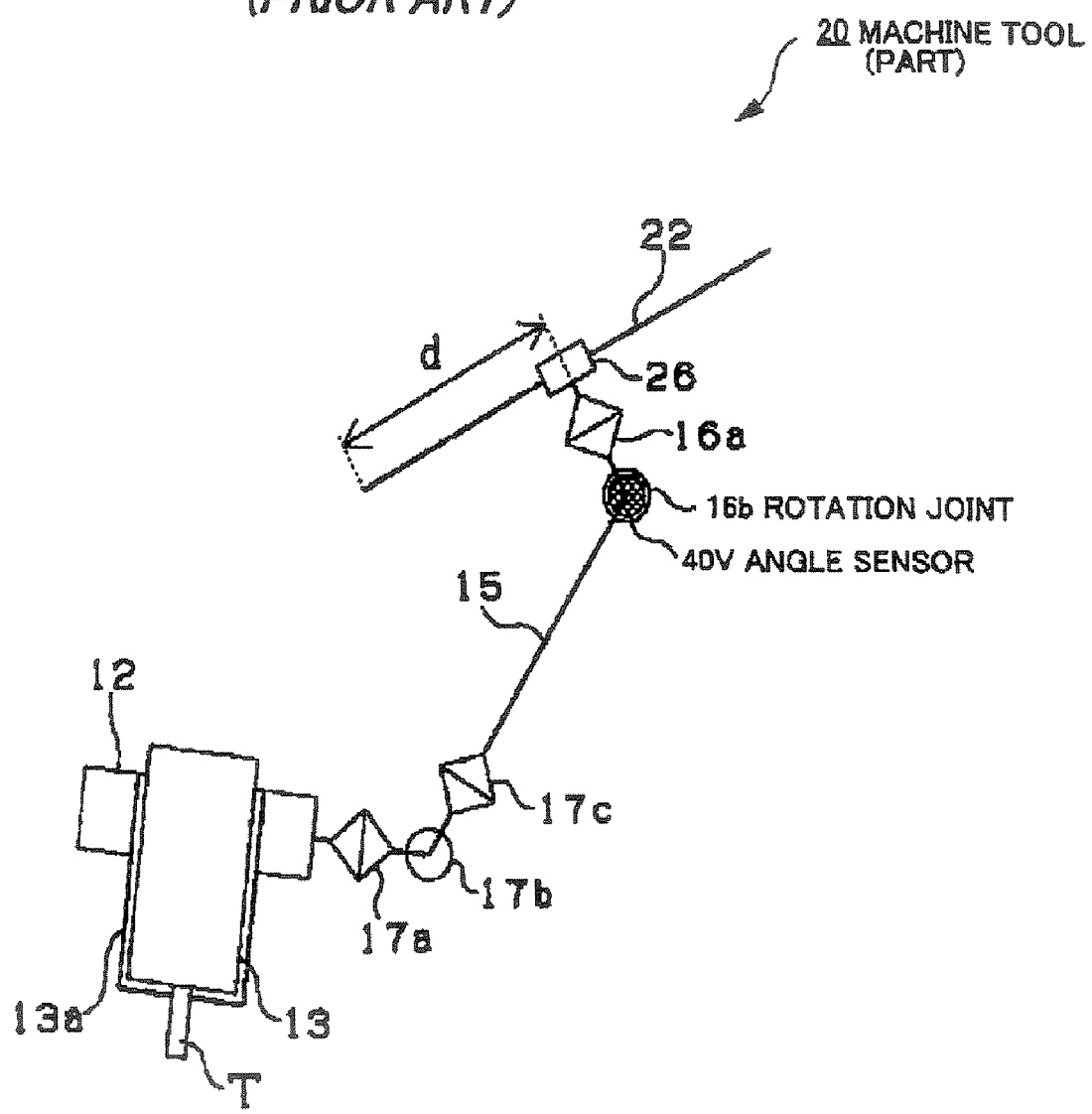
FIG. 18 is a perspective view explaining a conventional machine tool (2).

Firstly, the actuators 356 to 359 are driven to position the link head 301 in an arbitrary position (Step S1 in FIG. 15). Next, the output values from the position sensor 380 are measured in the state of positioning the link head 301 to obtain the error dL of the distance L between both the rotation joints 354 and 355 (Step S2 in FIG. 15). This processing is repeatedly executed k times to position the link head 301 in k different positions, thereby obtaining the k errors dL (Step S3 in FIG. 15). In this case, 16 is the number, k, of times of repetition which is required at minimum because there are a large number of mechanism parameters P, that is, there are 16 mechanism parameters P in this embodiment. Here, in order to enhance the precision, it is preferable to repeatedly execute 16 or more times to obtain a large number of errors dL. In addition, with respect to the position and posture of the link head 301, it is preferable in terms of enhancement of the precision to position the link head 301 in a wide range, that is, in the x-axis direction, in the z-axis direction and around the y-axis to obtain a large number of errors dL. On the other hand, for example, the error dL for two points which is obtained by only moving the link head 301 in the z-axis direction while the position of the link head 301 in the x-axis direction and the posture thereof around the y-axis are maintained as they are is unsuitable as the data used to identify the mechanism parameters P which will be described later.

The mechanism parameters P are identified by using the k errors dL thus obtained and the actuator coordinates (the position command values issued to the sliders 361, 362, 364 and 365, respectively) U. How to identity the mechanism parameters P will be described hereinafter.

When the actuator coordinates (command values) U are expressed by $U=(U_1, U_2, U_3, U_4)$, the coordinates of the sliders 361, 362, 364 and 365 at that time are given by $(X_1, Z_1), (X_2, Z_2), (X_3, Z_3)$ and $(X_4, Z_4)$, respectively, the coordinates of the rotation joint 354 are $(x_1, z_1)$, and the coordinates of the rotation joint 355 are $(x_2, z_2)$, the coordinates $(X_1, Z_1)$ and $(X_2, Z_2)$ of the sliders 361 and 362 can be expressed in the form of matrices as follows, respectively:

$$\begin{bmatrix} X_1 \\ Z_1 \end{bmatrix} = \begin{bmatrix} SLO1_x - U_3 \sin SLA1 \\ SLO1_z - U_1 \cos SLA1 \end{bmatrix} \quad (1)$$

$$\begin{bmatrix} X_2 \\ Z_2 \end{bmatrix} = \begin{bmatrix} SLO2_x + U_2 \sin SLA2 \\ SLO2_z + U_2 \cos SLA2 \end{bmatrix} \quad (2)$$

The link lengths RL1 and RL2 can be expressed as follows by using the coordinates $(x_1, z_1), (X_1, Z_1)$ and $(X_2, Z_2)$:

$$(x_1-X_1)^2+(z_1-Z_1)^2=RL1^2 \quad (3)$$

$$(x_1-X_2)^2+(z_1-Z_2)^2=RL2^2 \quad (4)$$

When $z_1$ is obtained from expressions (3) and (4), it is expressed as follows:

$$z_1 = -\frac{X_2-X_1}{Z_2-Z_1}x_1 + \frac{X_2^2-X_1^2+Z_2^2-Z_1^2-(RL2^2-RL1^2)}{2(Z_2-Z_1)} \quad (5)$$

When expression (5) is substituted into expression (3), expression (6) is obtained:

$$(x_1-X_1)^2 + \left(-\frac{X_2-X_1}{Z_2-Z_1}x_1 + \frac{X_2^2-X_1^2+Z_2^2-Z_1^2-(RL2^2-RL1^2)}{2(Z_2-Z_1)} - Z_1\right)^2 = RL1^2 \quad (6)$$

When expression (6) is reduced to expression (7):

$$(x_1-X_1)^2 + (ax_1+b)^2 - RL1^2$$

$$\left(\because a = -\frac{X_2-X_1}{Z_2-Z_1}, b = \frac{X_2^2-X_1^2+Z_2^2-Z_1^2-(RL2^2-RL1^2)}{2(Z_2-Z_1)} - Z_1\right) \quad (7)$$

expression (7) is rearranged as follows:

$$(a^2+1)x_1^2+(2ab-X_1)x_1+c=0$$

$$(\because c=b^2+X_1^2-RL1^2) \quad (8)$$

$x_1$ is obtained from expression (8) as follows:

$$x_1 = \frac{-(2ab-2X_1) \pm \sqrt{(2ab-2X_1)^2-4(a^2+1)c}}{2(a^2+1)} \quad (9)$$

$$= \frac{-(ab-X_1) \pm \sqrt{(ab-X_1)^2-(a^2+1)c}}{(a^2+1)}$$

Here, a smaller solution is taken for $x_1$:

$$x_1 = \frac{-(ab-X_1) - \sqrt{(ab-X_1)^2-(a^2+1)c}}{(a^2+1)} \quad (10)$$

When expression (10) is substituted into expression (5), $z_1$ is obtained. Likewise, $x_2$ and $z_3$ are obtained (step S1 in FIG. 15). As a result, the distance L between both the rotation joints 354 and 355 is expressed as follows:

$$L=\sqrt{(x_1-x_2)^2+(z_1-z_2)^2}$$

L: the distance between both the rotation joints 354 and 355 (11)

When the distance L is expressed as a function of the mechanism parameters P and the command values U, expression (11) is expressed as follows:

$$L=f(U,P)$$

command values: $U=(U_1,U_2,U_3,U_4)$, mechanism parameters: $P=(P_1,P_2,\ldots,P_n)$ (12)

When expression (12) is totally differentiated with respect to the mechanism parameters P, expression (13) is obtained:

$$dL = \frac{\partial f}{\partial p_1}dp_1 + \frac{\partial f}{\partial p_2}dp_2 + \cdots + \frac{\partial f}{\partial p_n}dp_n$$

dL: the error of the distance between both the rotation joints 354 and 355 $dp(dp_1,dp_2,\hat{},dp_n)$: the parameter error (13)

Here, the distance errors dL $(dL=dL_1, dL_2, \ldots, dL_k)$ about the k positions U $(U=U_1, U_2, \ldots, U_k)$ are expressed as follows:

the k positions: $U=U_1 \ldots U_k$ $$dL_1 = \frac{\partial f(U_1)}{\partial p_1}dp_1 + \frac{\partial f(U_1)}{\partial p_2}dp_2 + \cdots + \frac{\partial f(U_1)}{\partial p_n}dp_n \quad (14)$$

$$dL_2 = \frac{\partial f(U_2)}{\partial p_1}dp_1 + \frac{\partial f(U_2)}{\partial p_2}dp_2 + \cdots + \frac{\partial f(U_2)}{\partial p_n}dp_n$$

$$\vdots$$

$$dL_k = \frac{\partial f(U_k)}{\partial p_1}dp_1 + \frac{\partial f(U_k)}{\partial p_2}dp_2 + \cdots + \frac{\partial f(U_k)}{\partial p_n}dp_n$$

Expression (14) is expressed in the form of a matrix as follows:

$$\begin{bmatrix} dL_1 \\ dL_2 \\ \vdots \\ dL_k \end{bmatrix} = \begin{bmatrix} \frac{\partial f(U_1)}{\partial p_1} & \frac{\partial f(U_2)}{\partial p_2} & \cdots & \frac{\partial f(U_1)}{\partial p_n} \\ \frac{\partial f(U_2)}{\partial p_1} & \frac{\partial f(U_3)}{\partial p_2} & \cdots & \frac{\partial f(U_3)}{\partial p_n} \\ \vdots & \vdots & & \vdots \\ \frac{\partial f(U_k)}{\partial p_1} & \frac{\partial f(U_k)}{\partial p_2} & \cdots & \frac{\partial f(U_k)}{\partial p_n} \end{bmatrix} \begin{bmatrix} dp_1 \\ dp_2 \\ \vdots \\ dp_n \end{bmatrix} \quad (15)$$

$$dL = 3 \, dp$$

Therefore, the parameter errors are expressed as follows:

$$dp = J^* dL \quad (16)$$

Here, J* represents a pseudo inverse matrix, and for example, expressed by $J^* = (J^T J)^{-1} J^T$. As a result, the first estimates of the mechanism parameters are obtained as follows:

$$P_1 = P_0 + dp_0 \quad (17)$$

$P_1$: the first estimates of the mechanism parameters

Since the function f is a nonlinear one, the above calculation is repeatedly performed with the resulting mechanism parameters as new parameters, and the convergence calculation is performed until the parameter errors become equal to or smaller than allowable values, respectively, thereby correcting the mechanism parameters P (Step S4 in FIG. 15)

$$P_2 = P_1 + dp_1$$

$$P_3 = P_2 + dp_2$$

$$P_i = P_{i-1} + dp_{i-1} \quad (18)$$

After this, the last mechanism parameters are replaced with the mechanism parameters after correction thus obtained as the new ones P (Step S5 in FIG. 15), and the calibration work is completed. In the subsequent control for the link head 301, the actuator coordinates are arithmetically operated in accordance with the command values for the position and posture of the link head 301 using the mechanism parameters P after correction thus obtained.

The calibration for the mechanism parameters P can be carried out in the manner as described above. Since the works, for attaching and detaching the measuring instrument and the measurement jig, which have been conventionally required become unnecessary in this calibration work, the calibration can be carried out at arbitrary timing. That is to say, the calibration is carried out not only in the phase of shipment of the machine tool, but also right after start of the startup of the machine tool and after worming of the machine tool, which results in that the worming operation for the machine tool can be made unnecessary. In addition, the calibration work is performed periodically, which makes it possible to cope with the errors of the mechanism parameters P caused by the abrasion of the mechanism elements due the long term change.

According to the above-mentioned first to sixth embodiments of the invention, the following effects are obtained.

(1) Since the calibration for the mechanism parameters P can be carried out by using the position sensor 380 provided in the parallel mechanism, the attachment and detachment of the measuring instrument 40 and the measurement jig 60 which have been conventionally required in the phase of carrying out the calibration become unnecessary, and thus it is possible to shorten the work time that it takes to carry out the calibration.

(2) Since the mechanism parameters P are corrected by detecting the error of the distance between both the rotation joints 354 and 355 by using the position sensor 380, the resolution of detection of the errors becomes higher in each of those embodiments than in the case where the mechanism parameters are corrected by detecting the angle errors of the rotation joints by using the angle sensor. As a result, it is possible to obtain the satisfactory precision of identifying the mechanism parameters P.

(3) Since the calibration for the mechanism parameters P is carried out at given intervals or at arbitrary timing, it is possible to reduce the influence of the fluctuation in the mechanism parameters P due to the thermal displacement.

(4) Since the rotation joint 355 can be moved on the link head 301, it is possible to absorb the various kinds of errors due to the mechanism parameters P when the processing precision for the constituent components or parts, or the precision of assembly among the constituent components or parts is poor, and when the links 350A and 350B, and the links 351A and 351B are caused to expand and contract due to the thermal change in the phase of use or the like. Thus, it is possible to prevent the overload from being applied to the corresponding constituent components or parts and the actuators due to these size errors.

(5) Since the link groups 350 and 351 are disposed in parallel to each other through the link head 301, the links 350A and 350B, and the links 351A and 351B are prevented from crossing each other. As a result, the pivotal movement angles of the links 350A and 350B, and the links 351A and 351B can be set as sufficiently large angles, respectively, and thus the desired movement and pivotal movement operation (the pivotal movement range is equal to or larger than 360°) can be obtained as the movement and pivotal movement operation of the link head 301.

(6) Since the link head 301 is supported in the cantilever style to the bed (riser member) 10 by the link groups 350 and 351, it is possible to reduce the installation space for the link groups 350 and 351, and the slider guiding rails 360 and 363. As a result, it is possible to miniaturize the overall parallel mechanism.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A parallel mechanism adapted to control at least one of pivotal movement and linear movement of a link head having N degrees of freedom, the parallel mechanism comprising:
   (N+1) driving mechanisms that drive the link head; and
   a link mechanism including (N+1) links connected to the (N+1) driving mechanisms, respectively, the link mechanism being connected to the link head; and
   a connection portion interposed between the link mechanism and the link head, the connection portion being a slave connection portion that is connected to the link head and being relatively movable in one linear direction that is parallel to a longitudinal axis of the link head.

2. A parallel mechanism according to claim 1, wherein the degrees N of freedom of the link head are N=3,
wherein the link mechanism further comprises:
a bed,
a first link mechanism including a first pair of links having:
first ends that are connected to each other and are pivotable about a first y-axis through a first pivotal movement portion, and
second ends that are supported by the bed, the second ends of the first pair of links being pivotable about second and third y-axes substantially parallel to the first y-axis and movable along a first z-axis, the first z-axis intersecting substantially perpendicularly the second and third y-axes with respect to the bed, and
a second link mechanism including a second pair of links having:
first ends that are connected to each other and are pivotable about a fourth y-axis substantially parallel to the first y-axis through a second pivotal movement portion, and
second ends that are supported by the bed, the second ends of the second pair of links being pivotable about fifth and sixth y-axes parallel to the first y-axis and movable along a second z-axis with respect to the bed,
wherein the driving mechanisms are configured to move the second ends of each of the first and second pairs of links along the first and second z-axes, respectively, with respect to the bed,
wherein the link head is connected to the first and second pivotal movement portions,
wherein, with respect to the first pivotal movement portion, the link head is movable in the linear direction intersecting substantially perpendicularly the first y-axis,
wherein, with respect to the second pivotal movement portion, the link head is relatively nonmovable in a position where the second pivotal movement portion is offset in a direction intersecting substantially perpendicularly the first y-axis with respect to the slave connection portion of the first pivotal movement portion, and
wherein the link head is adapted to be moved within a plane intersecting perpendicularly the first y-axis and to be pivoted about the first y-axis by controlling the driving mechanisms.

3. The parallel mechanism according to claim 2, wherein the first and second link mechanisms are disposed on first and second planes, respectively, each intersecting perpendicularly the first y-axis, and the link head is disposed between the first plane and the second plane.

4. The parallel mechanism according to claim 2, wherein the first y-axis is a vertical line, and
wherein at least one of the links is a plate member having a thickness in the first y-axis direction.

5. The parallel mechanism according to claim 2, wherein the first y-axis is a horizontal axis.

6. The parallel mechanism according to claim 2, wherein the driving mechanisms include a linear actuator configured to pivotably connect the second ends of the first and second pairs of links, and drive the first and second pairs of links along the first and second z-axes, respectively.

7. The parallel mechanism according to claim 6, wherein the linear actuator includes:
first and second guide rails that are fixed to the bed and correspond with the first and second link mechanisms, respectively, and
sliders configured to move each link along the first and second guide rails, respectively, and
wherein the first guide rail, and the second guide rail extend along the first and second z-axes, respectively, and are disposed on the bed such that a predetermined space exists therebetween in a direction parallel to the first y-axis.

8. The parallel mechanism according to claim 6, wherein a first guide rail corresponding to the first link mechanism and a second guide rail corresponding to the second link mechanism are disposed on the bed such that a predetermined space exists therebetween in an x-axis direction, the x-axis being substantially perpendicular to the first y-axis and the first z-axis.

9. The parallel mechanism according to claim 2, wherein the driving mechanisms include an expansion actuator configured to pivotably connect the second ends of the first and second pairs of links, and to cause effective lengths of the links to expand and contract.

10. The parallel mechanism according to claim 2, wherein the driving mechanisms include a rotation actuator configured to pivotably connect the second ends of the first and second pairs of links, and to pivot the second ends of the first and second pairs of links.

11. The parallel mechanism according to claim 2, wherein the first and second ends of the first and second pairs of links of the first and second link mechanisms are connected to the link head and the driving mechanisms, respectively, through a rotation joint which has one degree of freedom and which is pivotable about an axis substantially parallel to the first y-axis.

12. The parallel mechanism according to claim 2, wherein the first and second ends of at least one of the links of one of the first and second pairs of links of the first and second link mechanisms are connected to the link head and the driving mechanisms, respectively, through a rotation joint which has one degree of freedom and which is pivotable about an axis substantially parallel to the first y-axis, and
wherein the first and second ends of the other links of the first and second pairs of links are connected to the link head and the driving mechanisms, respectively, through rotation joints each of which has two or three degrees of freedom and each of which are pivotable about at least an axis substantially parallel to the first y-axis.

13. The parallel mechanism according to claim 12, wherein the rotation joint having the two degrees of freedom is a universal joint, and the rotation joint having the three degrees of freedom is a spherical joint.

14. A parallel mechanism according to claim 1, further comprising:
a detector configured to detect an amount of relative movement between the slave connection portion and the link head; and
a control portion configured to convert command values corresponding to at least one of a pivotal movement position and a movement position, of the link head, given in accordance with a rectangular coordinate system into command values for the (N+1) driving mechanisms in accordance with mechanism parameters used to prescribe a construction of the parallel mechanism in order to control the (N+1) driving mechanisms,
wherein the control portion corrects the mechanism parameters in accordance with command values for the (N+1) driving mechanisms when the link head is operated by a predetermined amount of pivotal movement and a predetermined amount of movement, and output values of the detector at that time.

15. The parallel mechanism according to claim 14, wherein the degrees N of freedom of the link head are N=3 such that there are four driving mechanisms for driving the link head, and wherein the link mechanism further comprises:
a first link mechanism including a first pair of links having:
first ends that are connected to the link head and are pivotable about a first y-axis through a first pivotal movement portion connected to the slave connection portion, and
second ends that are connected to corresponding first and second driving mechanisms, respectively, and
a second link mechanism including a pair of links having:
first ends that are connected to the link head and are pivotable about a second y-axis that is substantially parallel to the first y-axis through a second pivotal movement portion connected relatively nonmovably to a position that is offset in a direction intersecting substantially perpendicularly the first y-axis with respect to a connection position of the first pivotal movement portion of the link head, and
second ends that are connected to corresponding third and fourth driving mechanisms, respectively.

16. The parallel mechanism according to claim 14, wherein the detector is a position sensor.

17. A calibration method for use in a parallel mechanism according to claim 14, comprising:
performing an operation for at least one of pivotal movement and linear movement, which are made at least k times for k mechanism parameters, to different positions and postures of the link head to acquire k output values from the detector; and
identifying correction values for the k mechanism parameters in accordance with command values for the (N+1) driving mechanisms when the pivotal movement and linear movement of the link head, are made at least k times and the k output values from the detector.

18. The calibration method according to claim 17, wherein the correction values for the k mechanism parameters are obtained by repeatedly performing convergence calculation.

19. The calibration method according to claim 17, wherein the correction values for the k mechanism parameters are obtained by repeatedly performing convergence calculation until parameter errors become equal or smaller than allowable values, respectively.

20. A machine tool comprising the parallel mechanism according to claim 2, wherein one of a tool or a work is mounted to the link head, and the other of the tool or the work is mounted to the bed.

* * * * *